United States Patent
Ishida et al.

(10) Patent No.: US 7,499,229 B2
(45) Date of Patent: Mar. 3, 2009

(54) FIXING METHOD, OPTICAL COMPONENT AND PICKUP MANUFACTURED BY THE FIXING METHOD

(75) Inventors: Kazuo Ishida, Hachioji (JP); Yoshitaka Toyoizumi, Hachioji (JP); Etsumi Nakajo, Hachioji (JP)

(73) Assignee: Konica Minolta Opto, Inc., Tokyo (JP)

(*) Notice: Subject to any disclaimer, the term of this patent is extended or adjusted under 35 U.S.C. 154(b) by 253 days.

(21) Appl. No.: 11/136,442

(22) Filed: May 25, 2005

(65) Prior Publication Data

US 2005/0264900 A1   Dec. 1, 2005

(30) Foreign Application Priority Data

May 31, 2004  (JP)  ............................. 2004-160658
May 31, 2004  (JP)  ............................. 2004-160712
May 31, 2004  (JP)  ............................. 2004-161481

(51) Int. Cl.
    *G02B 7/02*   (2006.01)
(52) U.S. Cl. .................. 359/811; 359/809; 359/819; 359/815
(58) Field of Classification Search .................. 359/811
    See application file for complete search history.

(56) References Cited

U.S. PATENT DOCUMENTS

| | | | | |
|---|---|---|---|---|
| 5,615,052 A | * | 3/1997 | Doggett | 359/811 |
| 6,463,921 B2 | * | 10/2002 | Shimazaki et al. | 125/21 |
| 6,502,960 B2 | * | 1/2003 | Naoe et al. | 362/259 |
| 6,603,612 B2 | * | 8/2003 | Nakano | 359/819 |
| 2004/0032671 A1 | * | 2/2004 | Wada et al. | 359/819 |

* cited by examiner

*Primary Examiner*—Jessica T Stultz
(74) *Attorney, Agent, or Firm*—Finnegan, Henderson, Farabow, Garrett & Dunner, L.L.P.

(57) ABSTRACT

Objective lens 20 is placed above the bobbin 40 at a position opposite to the light emitting end of the light guiding member, and the fixing portions 31 provided appropriately between the objective lens 20 and the lens support 41 are hardened in a short time because of being exposed to a UV hardening light beam which is selectively irradiated onto the fixing portions, or the intensity of which has been reduced to the wavelength region in which optical characteristics of the objective lens are practically deteriorated, in order to reduce the deterioration in the transmission characteristics in the wavelength range at which the optical elements are to be used, when fixing optical elements such as a plastic objective lens, etc., are used with a UV hardening type of adhesive.

24 Claims, 17 Drawing Sheets

FIXING METHOD, OPTICAL COMPONENT AND PICKUP MANUFACTURED BY THE FIXING METHOD

This application is based on Japanese Patent Application Nos. 2004-160658, 2004-160712 and 2004-161481 filed on May 31, 2004 in Japanese Patent Office, the entire content of which is hereby incorporated by reference.

BACKGROUND OF THE INVENTION

The present invention relates to a method of fixing an optical element such as a plastic lens, as well as to an optical component and an optical pickup on which an optical element such as an objective lens has been mounted using the fixing method.

Many types of pickups for playing back and recording data on an optical disc including CD (compact disc), DVD (digital versatile disc) and BD (Blu-ray disc) have been developed and manufactured (see Patent Document 1). As an objective lens mounted in these optical pickups, plastic lenses have frequently been employed because of their light weight, and making for precious focusing and tracking. A plastic objective lenses like the above is bonded and fixed on a bobbin, which is a moving part of the optical pickup, using resin adhesive for example.

[Patent Document 1] Tokkai No. Hei 10-162407

In the mass-production process of optical pickups for CDs and DVDs currently available on the market, a UV hardening type of adhesive is mostly employed for fixing objective lenses in order to ensure a speedy manufacturing process. However, if the same techniques are applied to mass-production process of optical pickups for BDs which utilize shorter wavelengths, the problems below become evident.

That is, it was found through experiments by the inventor of this invention that, because an intense UV light beam is irradiated onto the entire plastic objective lens while curing the UV hardening type of adhesive, the transmission characteristics related to blue light and ultraviolet light, which are supposed to be utilized on the mounted lens, are deteriorated for some specific types of plastic objective lenses. Deterioration of the transmission characteristics of plastic objective lenses due to irradiation of an intense UV light beam has not caused any problems because most plastic objective lenses have conventionally been utilized in the region of infrared or visible long wavelengths.

However, if a UV hardening type of adhesive is employed for mounting plastic objective lenses in the mass-production process of new type optical pickups which utilize blue light or ultraviolet light for recording and play back, the transmission characteristics related to blue light and ultraviolet light deteriorate which are utilized by the mounted plastic objective lens as above, and which results in problems in that the recording and playing accuracy of data is lowered, and further the expected performance may not be achieved.

Accordingly, an object of the present invention is to offer a method of fixing an optical element, such as a plastic objective lens in which deterioration of transmission characteristics can be reduced in the working wavelength range of the optical element in the case the optical element is fixed by using a UV hardening type of adhesive.

Another object of the present invention is to offer an optical component equipped with an optical element that has been fixed by using the above fixing method, as well as an optical pickup containing the optical component.

SUMMARY OF THE INVENTION

The first fixing method related to this invention is a fixing method to fix a plastic optical element, which is used within a prescribed working wavelength range in a wavelength region including at least blue light and ultraviolet light, onto another member with a light-hardening type of adhesive, is composed of (a) a process to supply the light-hardening type of adhesive to a bonding spot between the optical element and another member, (b) a process to harden a light-hardening type of adhesive by selectively irradiating a processing light beam onto the bonding spot. Here, the selective irradiation of a processing light beam onto the spot, basically means supplying the processing light beam to only the bonding spot and its periphery, however it also includes relatively reducing a light beam scattering beyond the bonding spot and its periphery, for example, the optical surface or the like. It also includes supplying a processing light beam entering area, other than ones such as an optical surface where a light beam tends to cause problematic effects to its characteristics when the light beam passes, even if the light beam scatters beyond the bonding spot and its periphery.

By means of the above fixing method, it is possible to reduce deterioration of the optical characteristics of an optical element, such as transmittance related to blue light or ultraviolet light, caused by incidence of a processing light beam into the interior of the optical element through the optical surface, because the processing light beam can be selectively irradiated onto the bonding spot for hardening of the light-hardening type of adhesive. Accordingly, it is possible to reduce deterioration of performance of a plastic optical element after it has been installed.

The second fixing method related to this invention is a fixing method to fix a plastic optical element, which is used within a prescribed working wavelength range in a wavelength region including at least blue light and ultraviolet light, onto another member with a light-hardening type of adhesive, and the said method is composed of (a) a process to supply a light-hardening type of adhesive to the bonding spot between the optical element and another member, (b) a process to harden the light-hardening type of adhesive by irradiating, onto the light-hardening type of adhesive and its periphery, a processing light beam from a solid-state light emitting element having light emission characteristics in a guaranteed hardening wavelength range, which practically reduces deterioration of optical characteristics in the prescribed working wavelength range of the optical element. Here, the intensity of light emission characteristics in the guaranteed hardening wavelength range is necessary to adequately harden fixing adhesive corresponding to the situation such as the purpose of use, however if the intensity is small, the processing time needs to be lengthened.

By means of the above fixing method, it is possible to reduce deterioration of the optical characteristics of an optical element, such as transmittance related to blue light or ultraviolet light, caused by incidence of a processing light beam into an optical element, because, for hardening of the light-hardening type of adhesive, the processing light beam from a solid-state light emitting element is irradiated onto the light-hardening type of adhesive and its periphery, which has a emission characteristics in a guaranteed hardening wavelength range, that practically reduces deterioration of optical characteristics in the prescribed working wavelength range of the optical element. Accordingly, it is possible to reduce deterioration of performance of the plastic optical element after it has been installed.

The third fixing method related to this invention is a fixing method to fix a plastic optical element, which is used within a prescribed working wavelength range in a wavelength region including at least blue light and ultraviolet light, onto another member with a light-hardening type of adhesive, and the said method is composed of (a) a process to supply the light-hardening type of adhesive to a bonding spot between the optical element and another member, (b) a process to harden the light-hardening type of adhesive by irradiating onto the light-hardening type of adhesive and its periphery, a processing light beam having light emission characteristics of prescribed intensity (normal and maximum) in the first wavelength range which practically reduces deterioration of optical characteristics in the prescribed working wavelength range of the optical element. Further the processing light beam has light emission characteristics in the second wavelength range, which exists in the ultraviolet range on the shorter wavelength side of the first wavelength range and practically deteriorates optical characteristics in the prescribed working wavelength range of the optical element and the intensity of which has been reduced to be not larger than a prescribed value relative to the above prescribed intensity. Here, the intensity of light emitting characteristics in the first wavelength is necessary to adequately harden fixing adhesive corresponding to situations such as the purpose of use, however if the intensity is small, the processing time needs to be lengthened. Further, the reduction of the emission characteristics in the second wavelength range to be not larger than a prescribed value relative to the prescribed intensity in the first wavelength range relates respectively to emission peaks and emission plateaus existing in the second wavelength range, and therefore, consequently the maximum emission intensity in the second wavelength is an important factor. Regarding comparison between emission characteristics of the first wavelength range and the second wavelength range, the relative intensity (specifically, spectral distribution shown by relative illuminance) can be employed.

By means of the above fixing method, it is possible to reduce deterioration of the optical characteristics of an optical element, such as transmittance related to blue light or ultraviolet light, caused by incidence of a processing light beam into an optical element, because, for hardening of the light-hardening type of adhesive, a lamp light beam, is irradiated onto the light-hardening type of adhesive and its periphery, which has emission characteristics in the second wavelength range, that exists in the ultraviolet range on the shorter wavelength side of the first wavelength range and practically deteriorates optical characteristics in the prescribed working wavelength range of the optical element, and the intensity of which has been reduced to be not larger than a prescribed value relative to the prescribed intensity. Accordingly, it is possible to reduce deterioration of performance of the plastic optical element after it has been installed.

The fourth fixing method related to this invention is a fixing method to fix a plastic optical element, which is used within a prescribed working wavelength range in a wavelength region including at least blue light and ultraviolet light, onto another member with a light-hardening type of adhesive, and the said method is composed of (a) a process to supply the light-hardening type of adhesive to a bonding spot between the optical element and another member, (b) a process to harden the light-hardening type of adhesive by irradiating, onto the light-hardening type of adhesive and its periphery, a lamp light beam having light emission characteristics in the first wavelength range which practically reduces deterioration of optical characteristics in the prescribed working wavelength range of the optical element and the intensity of which is not less than the first intensity. Further, the lamp light beam has the light emission characteristics in the second wavelength range which exists in the ultraviolet range on the shorter wavelength side of the first wavelength range, and practically deteriorates optical characteristics in the prescribed working wavelength range of the optical element, and the intensity of which has been reduced to be not larger than the second intensity.

By means of the above fixing method, it is possible to reduce deterioration of the optical characteristics of optical elements, such as transmittance related to blue light or ultraviolet light, caused by incidence of a processing light beam into an optical element, because, for hardening of the light-hardening type of adhesive, the lamp light beam is irradiated onto the light-hardening of type adhesive and its periphery, which has emission characteristics in the second wavelength range, that exists in the ultraviolet range on the shorter wavelength side of the first wavelength range and practically deteriorates optical characteristics in the prescribed working wavelength range of the optical element, and the intensity of which has been reduced to be not larger than the second intensity. Accordingly, it is possible to reduce deterioration of performance of the plastic optical element after it has been installed.

The optical component according to this invention is composed of an optical element and another member, which are fixed to each other by the above fixing method.

In an optical component related to the first fixing method, it is possible to reduce deterioration of the optical characteristics of an optical element, such as transmittance related to blue light or ultraviolet light, caused by incidence of a processing light beam into the interior of the optical element through the optical surface, since the processing light beam can be selectively irradiated onto the bonding spot to cure the light-hardening type of adhesive. Accordingly, it is possible to reduce deterioration of performance of the plastic optical element after it has been installed.

In an optical component related to the second fixing method, it is possible to reduce deterioration of the optical characteristics of optical elements, such as transmittance related to blue light or ultraviolet light, caused by incidence of a processing light beam into an optical element because, a processing light beam from a solid-state light emitting element is irradiated onto the light-hardening type of adhesive and its periphery for hardening of the light-hardening type of adhesive to fix the optical element and another member to each other. The processing light beam has emission characteristics in a guaranteed hardening wavelength range and practically reduces the deterioration of optical characteristics in the prescribed working wavelength range of the optical element. Accordingly, it is possible to reduce deterioration of performance of the plastic optical element after it has been installed.

In an optical component related to the third and fourth fixing method, it is possible to reduce deterioration of the optical characteristics of optical elements, such as transmittance related to blue light or ultraviolet light, caused by incidence of a lamp light beam into the optical element, because, for hardening of the light-hardening type of adhesive to fix an optical element and another member with each other, the lamp light beam having light emission characteristics in the second wavelength range is irradiated onto the light-hardening type of adhesive and its periphery, which practically deteriorates optical characteristics in the prescribed working wavelength range of the optical element and the intensity of which has been reduced to be not larger than the prescribed value relative to the prescribed intensity. Accordingly, it is possible to reduce deterioration of its performance after a plastic optical element has been installed.

An optical component related to the first fixing method is composed of (a) a plastic optical element to be used in a prescribed working wavelength range in a wavelength region including at least blue light and ultraviolet light, (b) another member to be bonded to the optical element, (c) a bonding means which is formed of a light-hardening type of adhesive to bond the optical element to the other member by light-hardening at prescribed bonding spots and (d) a processing light beam is selectively irradiated onto the bonding spots for hardening of the light-hardening type of adhesive.

The optical component related to the second fixing method is composed of (a) a plastic optical element to be used in a prescribed working wavelength in a wavelength region including at least blue light and ultraviolet light, (b) another member to be bonded to the optical element, (c) a bonding means which is formed of a light-hardening type of adhesive to bond the optical element to the other member by light-hardening at prescribed bonding spots and (d) a processing light beam emitted from solid-state light emitting element having light emission characteristics in a guaranteed hardening wavelength range and practically reducing deterioration of the optical characteristics in the prescribed working wavelength range of the optical element is irradiated onto the light-hardening type of adhesive and its periphery for hardening of the light-hardening type of adhesive.

The optical component related to the third and fourth fixing method is composed of (a) a plastic optical element to be used in a prescribed working wavelength range in a wavelength region including at least blue light and ultraviolet light, (b) another member to be bonded by the optical element, (c) a bonding means which is formed of a light-hardening type of adhesive to bond the optical element to another member by light-hardening at prescribed bonding spots and (d) for hardening of the light-hardening type of adhesive, a lamp light beam is irradiated onto the light-hardening type of adhesive and its periphery, which has light emission characteristics of prescribed intensity (normal and maximum) in the first wavelength range which practically reduces deterioration of optical characteristics in the prescribed working wavelength range of the optical element and light emission characteristics in the second wavelength range which exists in the ultraviolet range on the shorter wavelength side of the first wavelength range and practically deteriorates optical characteristics in the prescribed working wavelength range of the optical element and the intensity of which has been reduced to be not larger than a prescribed value relative to the above prescribed intensity for hardening of the light-hardening type of adhesive.

Also in the case of the above optical component, degradation of the optical characteristics of the optical element can be reduced, such as transmittance related to blue light and ultraviolet light, caused by the incidence of a processing light beam or a lamp light beam for light-hardening into the optical element. Accordingly, it is possible to reduce deterioration of its performance after a plastic optical element has been installed.

A fixing device related to the first fixing method is (a) a fixing device to bond a plastic optical element to be used in a prescribed working wavelength range in a wavelength region including at least blue light and ultraviolet light, onto another member by using a light-hardening type of adhesive being composed of (b) a supplying means to supply the light-hardening type of adhesive to the bonding spot between the optical element and another member, (c) a light irradiating means to harden the light-hardening type of adhesive by selectively irradiating a processing light beam onto the bonding spots.

In the above fixing, it is possible to reduce a deterioration of the optical characteristics of optical elements, such as transmittance related to blue light or ultraviolet light, caused by incidence of a light beam into the interior of the optical element through the optical surface because light irradiating means makes it possible to selectively irradiate the processing light beam. Accordingly, it is possible to reduce deterioration of performance of the plastic optical element after it has been installed.

The optical pickup of the present invention is equipped with the above optical component and hence capable of reading data from the recording surface of an optical recording medium or writing data on the recording surface.

In the above optical pickup, since the above-mentioned fixing method is employed to fix an optical element such as an objective lens, high-speed and high-density recording and playback of data can be realized.

BRIEF DESCRIPTION OF THE DRAWINGS

FIG. 3(a) shows an adhesive supplying device to supply a UV hardening type of adhesive to the fixing spots, while FIG. 3(b) shows a UV processing device to irradiate a UV hardening light beam to a UV hardening type of adhesive.

DETAILED DESCRIPTION OF THE PREFERRED EMBODIMENT

Figure 1:
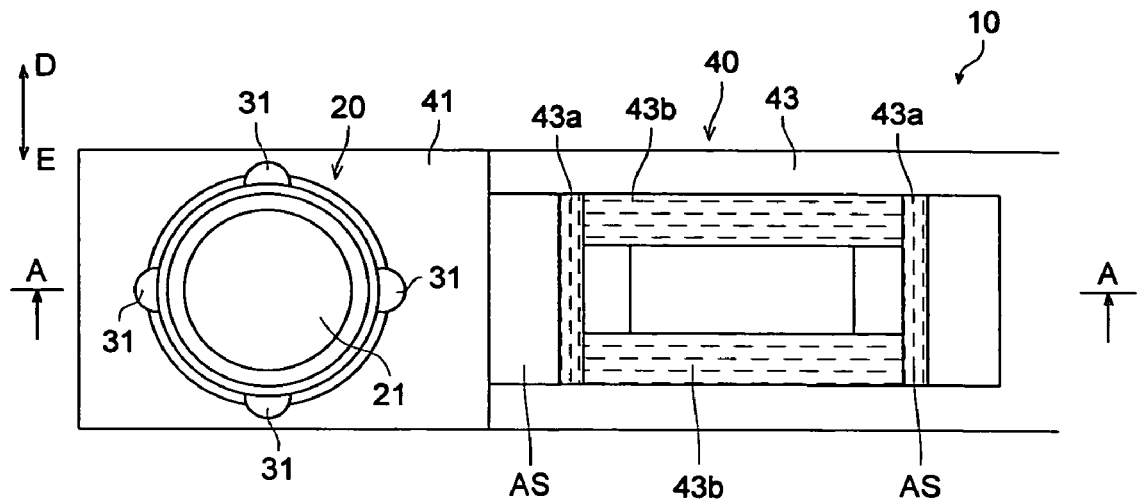
FIG. 1(a) is a plan view of the lens unit related to the first embodiment.
FIG. 1(b) is a cross-sectional side view of the lens unit.
Figure 1:
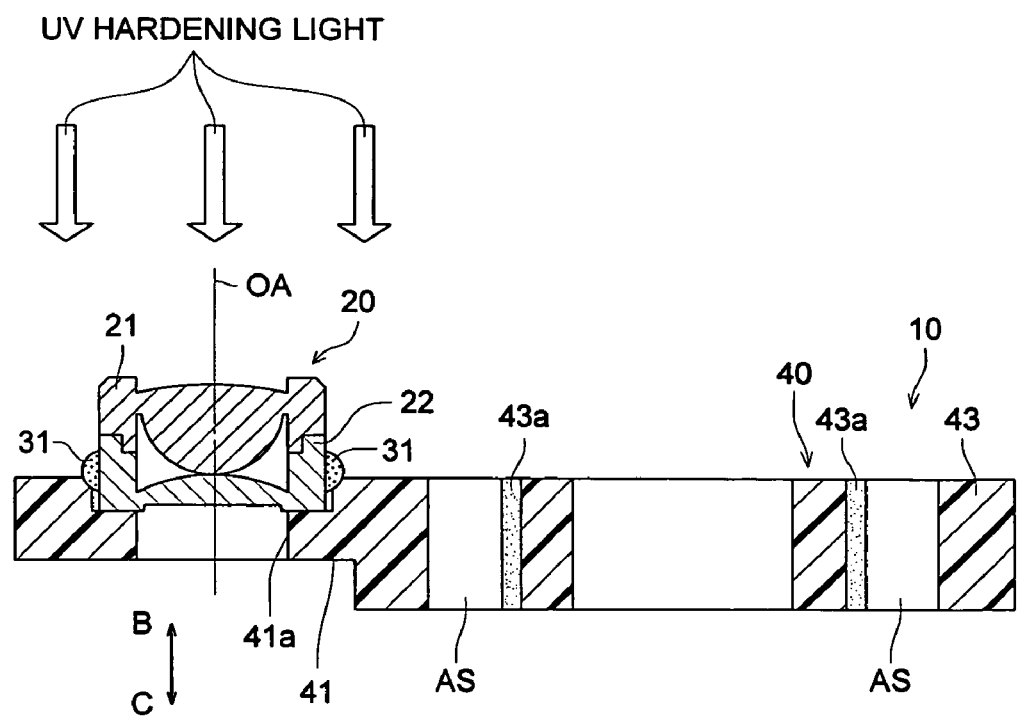

In another embodiment of the present invention, the other member stated above is a supporting member for supporting the optical element. In this case, the process for fixing the optical element on the supporting member, such as holder, can be ensured, and the optical characteristics of the optical element can be favorably maintained even after it is fixed onto the supporting member.

In another embodiment of the present invention, other part stated above is an optical member for performing specified optical functions in cooperation with the optical element. In this case, connection and alignment of the optical element with another optical member can be simplified and ensured, whereby the optical characteristics of the optical element and optical member can be favorably maintained even after they are fixed to each other.

In addition, in an embodiment of the present invention, the optical element of the above optical component is an objective lens through which an incident luminous flux converges to form a spot on the recording surface of a recording medium. In this case, in assembling an optical pickup that reads and writes data from and onto an optical recording medium with blue light and ultraviolet light, degradation of the transmission characteristics of the objective lens and consequently that of the image formation characteristics can be reduced.

In another embodiment related to the first fixing method, the processing light beam is selectively irradiated to the bonding spot by means of a light guiding means. In this case, the processing light beam can be certainly conducted to the bonding spot without energy loss and conduction of a processing light beam can be prevented, which has a possibility to cause optical characteristics deterioration to the main portion of the optical element.

In another embodiment related to the first fixing method, the light guiding means is an optical fiber which leads a processing light beam from a light source to the irradiating position opposite to the bonding spot. In such case, the processing light beam can be effectively led to the bonding spot by means of a simple and efficient optical fiber.

In another embodiment related to the first fixing method, the light guiding means is at least one reflecting means which leads a conducted light beam from a light source to the irradiating position opposite to the bonding spot. In this case, the processing light beam can be led to the bonding spot with polarization by using an optical member such as a mirror.

In another embodiment related to the first fixing method, a processing light beam is prevented from entering the optical surface on the periphery of the bonding spot by using light-shielding means. In this case, the processing light beam can be certainly conducted only to the bonding spot, which prevents the transmission of a processing light beam having a possibility to cause optical characteristics deterioration of the main portion of the optical element.

In another embodiment related to the first fixing method, the light shielding means is a mask to cover the optical surface of the optical element. In this case, the processing light beam can be accurately led to the bonding spot with a simple and secure mask.

In another embodiment related to the first fixing method, the light shielding means is a filter covering the optical surface of an optical element. In this case, the processing light beam can be accurately led to the bonding spot with a filter which can have multiple functions. The filter may be one which can reduce light of a specific wavelength harmful to the optical element, as well as the entire range of the wavelength.

In another embodiment related to the first fixing method, a prescribed working wavelength is in the range from of 380 to 450 nm and the processing light beam has its emission peaks in the hardening wavelength range of 280 to 450 nm. In this case, deterioration of the optical characteristics of a plastic optical element can be effectively reduced such as transmission characteristics caused by light of a wavelength shorter than or equal to 330 nm, which is considered to deteriorate the optical characteristics of a plastic optical element of the working wavelength range of 380 to 450 nm.

In another embodiment related to the first fixing method, the processing light beam is emitted from a high pressure mercury vapor lamp. In this case, the adhesive can be irradiated by the processing light beam with sufficient luminance.

In another embodiment related to the first fixing method, an optical component composed of the optical element or optical member is either a single lens or a compound lens. In this description, a compound lens means a lens composed of multiple lenses of the same or different types which are formed into a single unit. In such case, bonding between optical elements needed in the manufacture of the single lens or a compound lens, can be completed easily and surely with a light hardening type of adhesive, and the optical characteristics of the manufactured single lens and compound lens, can be favorably maintained.

In another embodiment related to the second fixing method, the prescribed working wavelength is in the range of 380 to 450 nm and the processing light beam has its emission peaks in the guaranteed hardening wavelength range of 350 to 450 nm. In this case, because light of the wavelength range shorter than or equal to 330 nm is not employed, which is considered to deteriorate the optical characteristics of plastic optical elements in the working wavelength range of 380 to 450 nm and to be harmful to the optical elements, and the guaranteed hardening wavelength range of 350 to 450 nm is employed as a processing light beam, deterioration of the optical characteristics of plastic optical elements such as transmission characteristics can be effectively reduced in the working wavelength range of 380 to 450 nm.

In another embodiment related to the second fixing method, the solid-state light emitting element is either an LED or a semiconductor laser. In this case, the light-hardening process can be effectively conducted with small but high power light-emitting elements.

In another embodiment related to the second, third and fourth fixing methods, an optical component composed of the optical element and optical member is either a compound lens, a cemented lens or a hybrid lens. In this description, a compound lens means a lens composed of multiple lenses of the same or different types that are formed into one unit; a cemented lens means a lens composed of multiple lenses that are cemented to each other into one piece on their optical surfaces; and a hybrid lens means a lens composed of different lens materials such as a plastic lens and a glass lens that are combined into one unit. In this case, bonding between optical elements required in the manufacture of a compound lens, a cemented lens and a hybrid lens can be completed easily and surely with a light-hardening type of adhesive, and the optical characteristics of the manufactured compound lens, cemented lens and hybrid lens can be favorably maintained.

In another embodiment related to the third and fourth fixing methods, the prescribed working wavelength range is from 380 to 450 nm and the lamp light has its first emission peak P1 in the first wavelength range of 350 to 450 nm and its second emission peak P2 which has intensity of less than or equal to 30% of that of first emission peak P1, in the second wavelength range from 280 to 330 nm. Here, second emission peak P2 is not limited to a single peak but may be plural. That is, when there are a plurality of second peaks, the intensity of any of them should be less than or equal to 30% of that of first emission peak P1. In such case, in the second wavelength range from 280 to 330 nm which is considered to be harmful to the optical element, because reduced is the relative intensity of second emission peak P2 which reduces practical deterioration in the prescribed working wavelength range of the optical element from 380 to 450 nm, deterioration of the optical characteristics of plastic optical elements, such as transmission characteristics, can be effectively reduced in the working wavelength from 380 to 450 nm.

In another embodiment related to the third and fourth fixing methods, a lamp light beam is a light beam emitted from a light source, which has been reduced in intensity in the second wavelength range. In such case, necessary line spectra are selected from the light source having a variety of line spectra, and a light-hardening type adhesives can be effectively hardened by them.

In another embodiment related to the third and fourth fixing methods, the lamp light beam is picked up via at least one of a filter or a mirror which have reducing characteristics of the light beam from a light source in the second wavelength range. In this case, the light beam in the targeted second wavelength range can be easily reduced with a filter or mirror.

The First Embodiment

An objective lens unit for optical pickup, which is an optical component according to the first embodiment of the present invention, is described hereunder.

FIG. 1(a) is a plan view of objective lens unit 10, while FIG. 1(b) is the A-A cross-sectional view of it. Objective lens unit 10 is composed of compound objective lens 20 which is an optical component which needs to be installed opposite to the optical recording medium (not shown) and bobbin 40 which is a supporting member supporting compound objective lens 20 and shifts in focusing direction BC and tracking direction DE together with the lens. Objective lens unit 10 is used in an optical pickup that utilizes at least blue light or ultraviolet light (at a working wavelength range from 380 to 450 nm, for example), but in addition to this, it is also used for laser luminous flux for DVDs which utilize red light (at a working wavelength range from 600 to 700 nm, for example) and for laser luminous flux for CDs that utilizes near-infrared light (at a working wavelength range from 750 to 850 nm, for example). Above compound objective lens 20 is made of a pair of lenses bonded with a UV hardening type of adhesive, which will be described later.

Compound objective lens 20 is so mounted as to fit into opening 41a of lens support 41 provided on bobbin 40. That is, compound objective lens 20 is firmly fixed onto lens support 41 by plural fixing portions 31, which are the bonding means structured of a UV hardening type of adhesive, for example at four places around it. In order to harden these fixing portions 31, a UV light beam is irradiated onto the fluid UV hardening type adhesive applied to the joint between the two so as to cause a photo-polymerization reaction of the UV hardening type of adhesive. In this process, in the case of the first fixing method, a UV hardening light beam is irradiated not on the entire compound objective lens 20 but only on fixing portions 31. That is, when a UV hardening light beam is irradiated on the entire compound objective lens 20, the UV hardening light beam, depending upon its wavelength, may deteriorate transmittance or other optical characteristics of the main portion of compound objective lens 20, however the deterioration of compound objective lens 20 is reduced by irradiating a UV hardening light beam only on fixing portions 31 using a technique to be described later. On the other hand, based on the second to fourth fixing methods, the processing light beam, being a UV hardening light beam, is irradiated not only on fixing portions 31, but also onto the entire compound objective lens 20 for the sake of simplified manufacturing process. As a result of the above, there is the possibility that the optical characteristics of compound objective lens 20 are degraded such that the transmittance of the optical element, which is a main portion of compound objective lens 20, is lowered depending upon the wavelength of the UV hardening light. Means to solve this problem will be described later.

Bobbin 40 has bobbin body 43 extending from lens support 41, which supports compound objective lens 20, and bobbin body 43 is structured of focusing coil 43a which produces a drive force for shifting compound objective lens 20 in focus direction BC along optical axis OA, and tracking coil 43b which produces a drive force for shifting compound objective lens 20 in tracking direction DE, perpendicular to optical axis OA. In aperture space AS, provided is a yoke (not shown) constituting a magnetic circuit for focusing and tracking.

Figure 2:
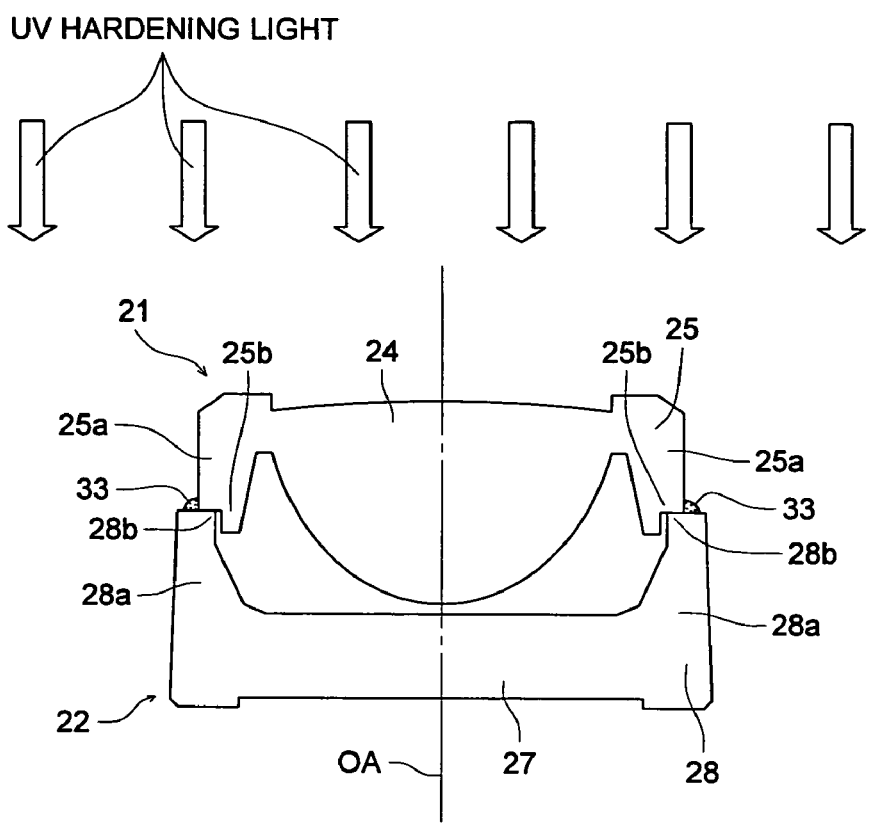
FIG. 2 is a cross-sectional side view of compound objective lens to be installed as the lens unit of FIG. 1.

FIG. 2 is a cross-sectional side view of compound objective lens 20. Compound objective lens 20 is, for example, a combination of lens member 21, which is an optical element for light collection, and phase optical element member 22, which is an optical member for correction of wave aberration. Lens member 21 is a one-piece formed plastic component (which for example can be formed from acrylic polymer or cyclo-olefin type polymer, but specifically preferable is PMMA or PC), being composed of round lens portion 24 and circumferential flange portion 25 formed around it. Phase optical element member 22 is also a one-piece formed plastic component, being composed of round phase element portion 27 and circumferential flange portion 28 formed around it. As flange portion 25 of lens member 21 and flange portion 28 of phase optical element member 22 are connected to each other at the mating surfaces on both flange portions 25 and 28 by four hardened fixing portions 33 (of which only two are shown) which are the bonding means formed of a UV hardening type of adhesive, whereby assembly of compound objective lens 20 is completed. The material used for fixing portions 33 can for example be an ultraviolet-ray hardening type of monomers such as acryloyl group or methacryloyl group, incorporating a photo-polymerization initiator.

In lens member 21, lens portion 24 is, for example, so designed that the wave aberration on Blu-ray light becomes minimum; and specifically, a light beam from a light source of a 408 nm wavelength is collected on the recording surface of a Blu-ray disc through an NA 0.85 aperture. On the other hand, flange portion 25 has circumferential projection 25a projecting toward phase optical element member 22 and circumferential step 25b on which a recessed exterior is formed on the tip of the projection. This step 25b is used to align lens member 21 with phase optical element member 22 in the direction along the optical axis OA and perpendicular to optical axis OA.

In phase optical element member 22, phase element portion 27 is for example so designed that wave-front change is rarely caused by the Blu-ray system wavelength and wave aberration is corrected by DVD system wavelength. In other words, compound objective lens 20 composed of above lens member 21 and phase optical element member 22 is so designed that wave aberration becomes minimum not only on Blu-ray light but also on DVD light. To be specific, a light beam from a light source of a 408 nm wavelength is collected onto the recording surface of a Blu-ray disc through an NA 0.85 aperture and also a light beam from a 650 nm wavelength light source is collected on the recording surface of a DVD disc through an NA 0.65 aperture. Flange portion 28 has circumferential projection 28a projecting toward lens member 21, and inner circumferential edge 28b is formed on the tip of the projection. This edge 28b, along with step 25b formed on lens member 21, is used to align lens member 21 with phase optical element member 22. Both members 21 and 22 aligned as above, are firmly fixed together by plural fixing portions 33 formed of the above UV hardening type of adhesive. In order to harden fixing portions 33 quickly in a specific process on the manufacturing Line, a UV hardening light beam is irradiated over the UV hardening type of adhesive applied to the joint between the aligned members at appropriate timing so as to cause a photo-polymerization reaction of the UV hardening type of adhesive. In this process, according to the second to fourth fixing methods, the UV hardening light beam is irradiated not only on fixing portions 33 but also on the entire compound objective lens 20 for the sake of simplified manufacturing process.

<Adhesive Supplying Process>

FIG. 3(a) is a schematic diagram of the adhesive supplying device for supplying a UV hardening type of adhesive to the fixing portions of compound objective lenses 20, and FIG. 3(b) is a schematic diagram of the UV processing device for irradiating the UV hardening type of adhesive with ultraviolet rays.

In FIG. 3(a), the adhesive supplying device is composed of adhesive ejecting device 51 which not only holds the UV hardening type of adhesive but also discharges the adhesive at appropriate timing, and movable nozzles 52 which apply the UV hardening type of adhesive discharged by adhesive ejecting device 51 to pre-determined bonding locations of compound objective lens 20 and bobbin 40. The UV hardening type of adhesive is supplied by this adhesive supplying device and is coated at four locations which become fixing portions 31 on the periphery of compound objective lens 20 which has been placed and aligned on top of bobbin 40.

<Adhesive Hardening Process>

Next, the adhesive hardening process according to the first fixing method of the present invention will now be described in detail below.

In FIG. 3(b), the UV processing device is provided with high pressure mercury vapor lamp 54, which becomes the light source, concave mirror 55 which reflects the light beam from the high pressure mercury vapor lamp 54 toward the front, lens 56 which focuses the UV hardening light beam, light guiding member 57 made of an optical fiber, etc., which guides the UV hardening light beam that has been focused by lens 56, exposure head 58 which is provided on the leading side of light guiding member 57 and which emits the UV hardening light beam with a specific distribution corresponding to fixing portions 31, and driving device 59 which moves exposure head 58 to the appropriate location. During UV hardening, exposure head 58 is moved to the appropriate location by operating driving device 59, and its bottom tip comes opposite to and contacts compound objective lens 20 placed above bobbin 40. Thereafter, by guiding light guiding member 57 the light beam from high pressure mercury vapor lamp 54, it is possible to emit a UV hardening light beam with a desired pattern from the bottom tip of exposure head 58, and hence it is possible to irradiate the UV hardening light beam only on fixing portions 31 and 33 and to harden them in a short time.

Figure 3:
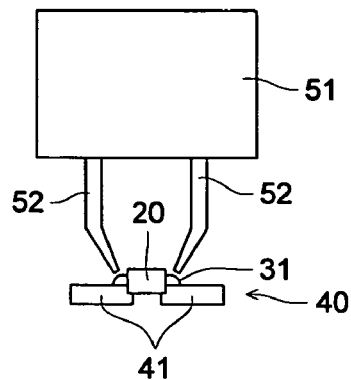
Figure 3:
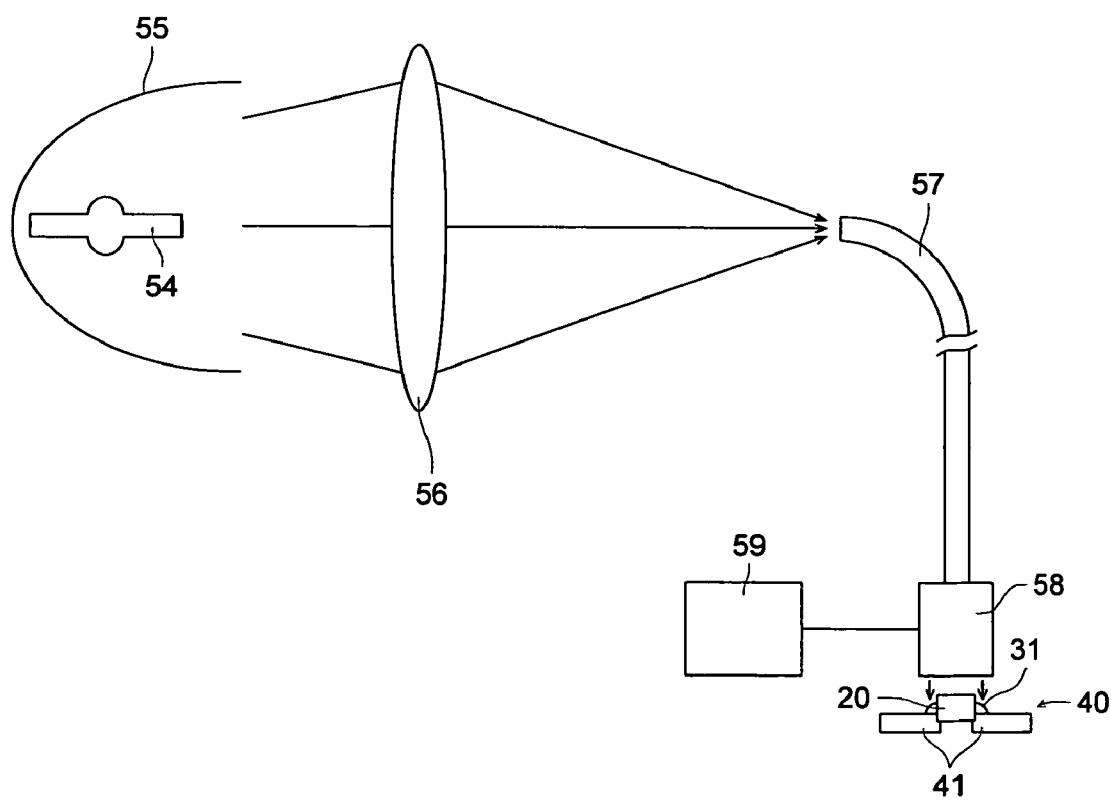
Figure 4:
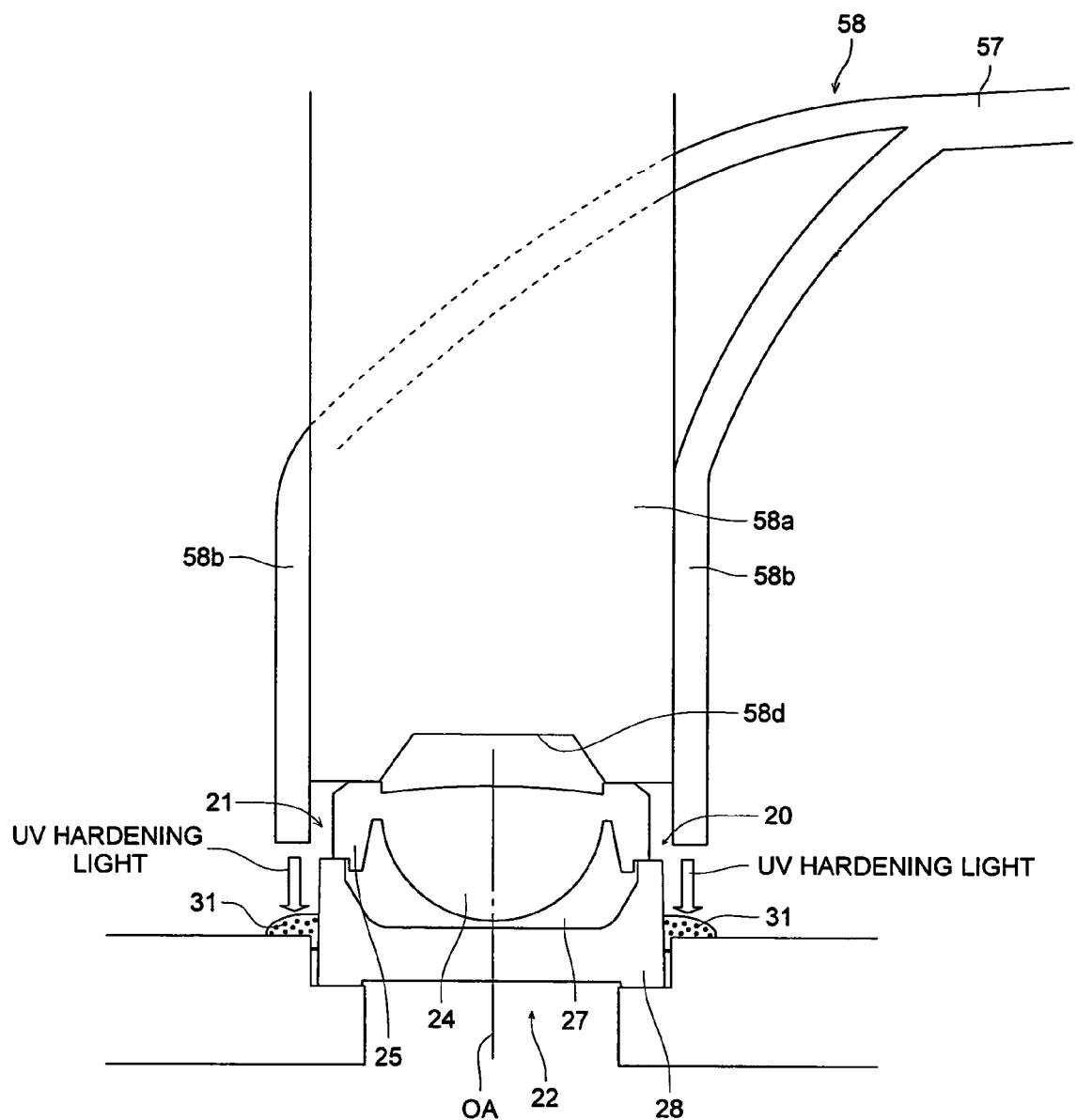
FIG. 4 shows details of the enlarged exposure head mounted on the UV processing device of FIG. 3(b).
Figure 5:
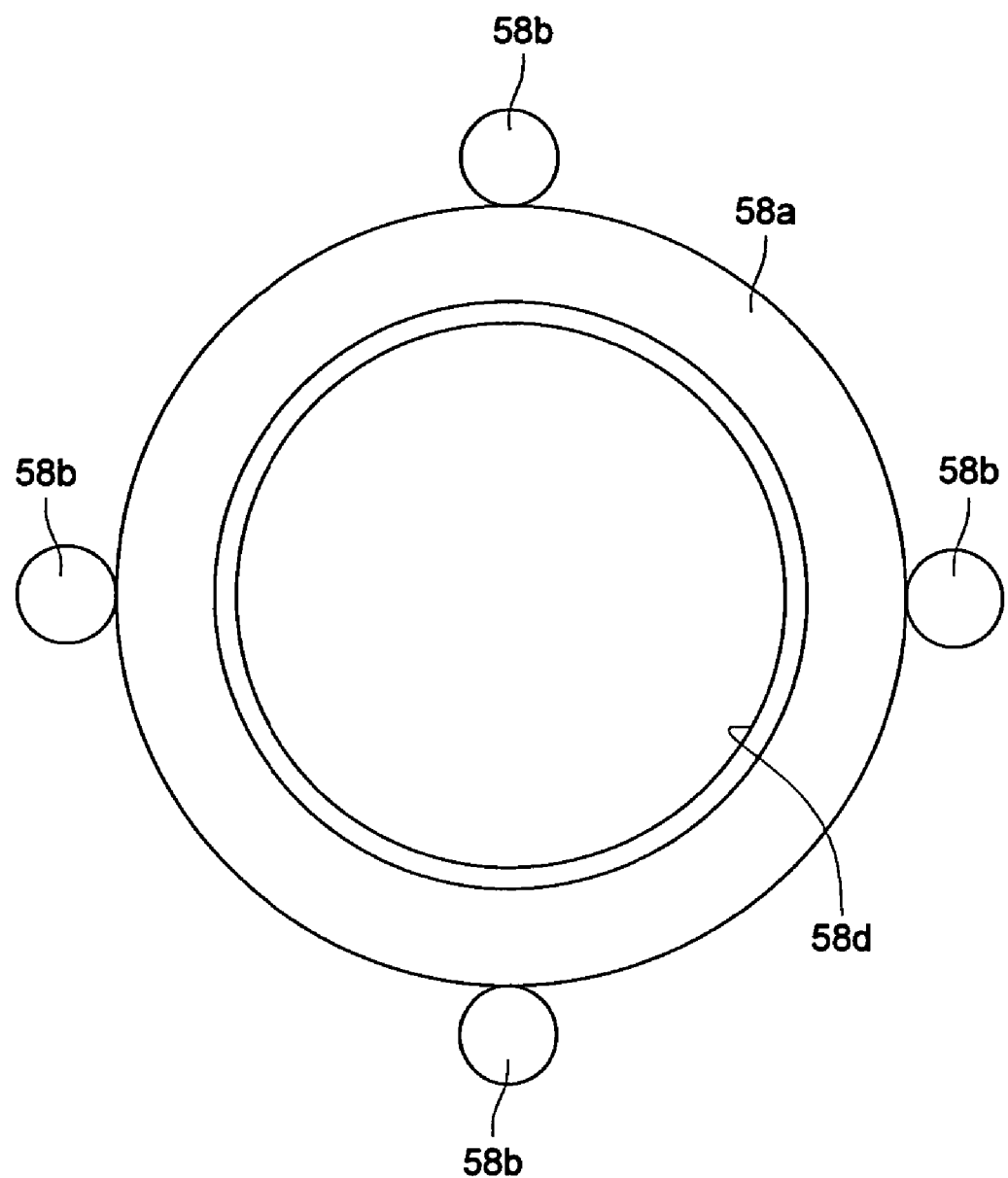
FIG. 5 is a view of the FIG. 4 exposure head viewed from below.

FIG. 4 is an enlarged view showing an example of the specific structure of exposure head 58 shown in FIG. 3(b), and FIG. 5 is a diagram explaining the state of exposure head 58 as observed from below. Exposure head 58 is composed of shaft 58a which can be displaced in three dimensions by driving device 59 shown in FIG. 3(b), and four branched fiber guides 58b which are fixed on the periphery of shaft 58a and a UV hardening light beam is emitted from the bottom tips. Recessed part 58d is formed at the center of the bottom end surface of 58a so that the optical surface of lens member 21 and the like, are not damaged when shaft 58a comes into contact with compound objective lens 20. Four branched fiber guides 58b are fixed at equal intervals on the periphery at the tip of shaft 58a and are connected to light guiding member 57. In other words, the UV hardening light beam guided by light guiding member 57 is separated into four branched fiber guides 58b and irradiates the bonding locations, that is, fixing portions 31 opposite the bottom tip (the irradiating position) of each of these branched fiber guides. Further, it is obvious that the number and the placement of branched fiber guides 58b can be changed appropriately according to the number and placement of fixing portions 31.

FIG. 6(a) is a side view to explain a modified example of exposure head 58 shown in FIG. 4, while FIG. 6(b) is a view of its bottom. In this case of this exposure head 158, shaft 158a itself is composed of an optical fiber or an optical waveguide rod, and the top end of shaft 158a is connected to light guiding member 57. Further, circular mask 158f is formed at the center of the bottom end of shaft 158a so that, when exposure head 158 is placed very close to compound objective lens 20, the UV hardening light beam is not irradiated onto lens member 21. Although mask 158f can be made like an ND filter which absorbs light, it can also be made as a mirror, and also, it is possible to form it as a bypass filter which shuts out only the ultraviolet light harmful to the lens.

Figure 7:
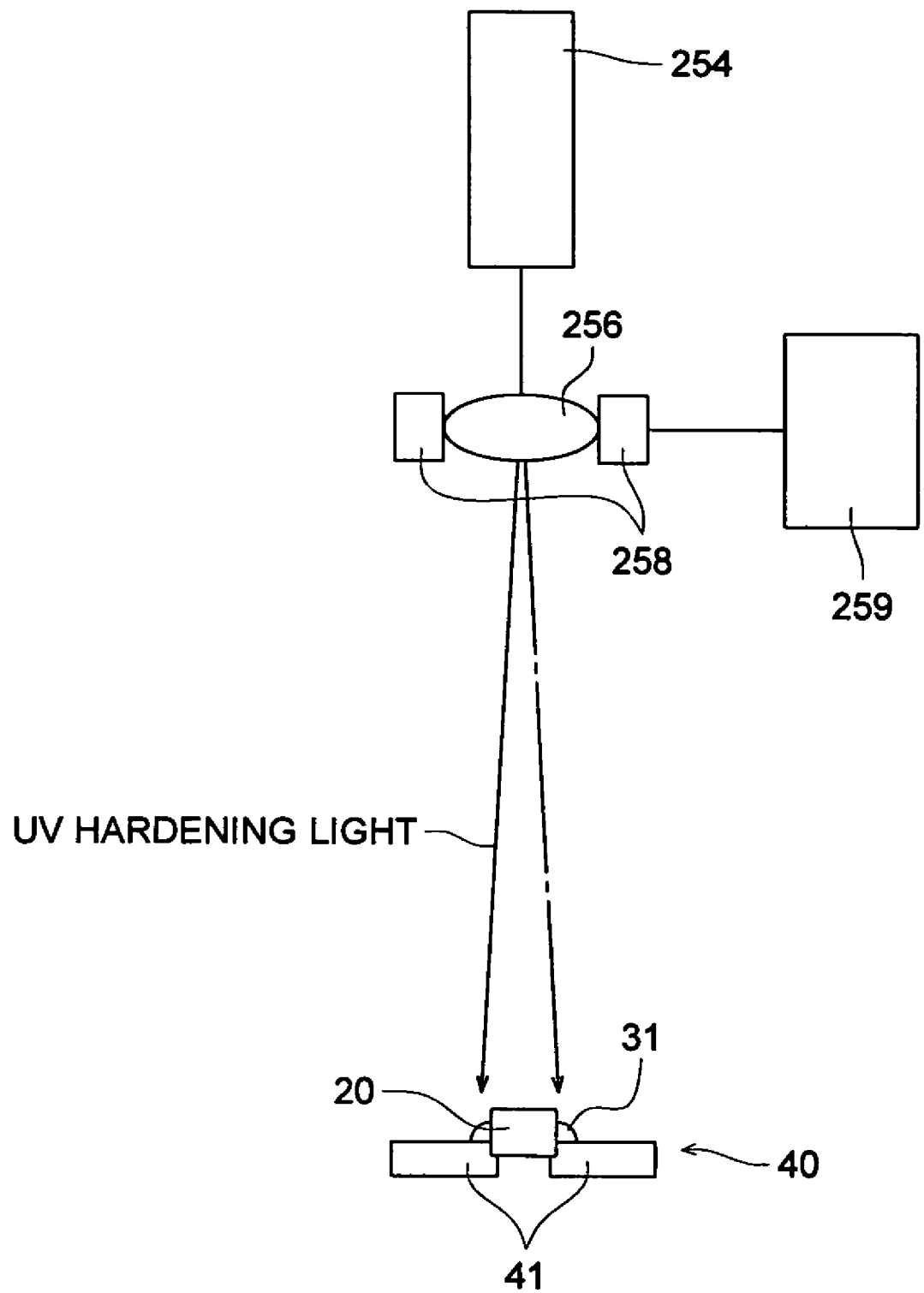
FIG. 7 is a schematic diagram of an example of modification of the FIG. 3(b) UV processing device.

FIG. 7 is a diagram explaining a modified example of the entire UV processing device shown in FIG. 3. In this case, the UV processing device is provided with ultraviolet ray laser 254, lens 256 which appropriately converges the light beam from ultraviolet ray laser 254 as a UV hardening light beam, actuator 258 which displaces lens 256 at high speed two-dimensionally perpendicular to the optical axis, and driving device 259 which adjusts the angle of emission of the UV hardening light beam at appropriate timing by operating actuator 258. It is possible to move lens 256 perpendicular to the optical axis to the desired position, thereby irradiating the spot-shaped UV hardening light beam from ultraviolet ray laser 254 only on fixing portions 31 thereby hardening it in a short time, by means of suitably operating actuator 258 by adjusting appropriately the output from driving device 259. Further, it is also possible to move the spot of light for UV hardening to any desired position using a mirror with its driving device, instead of lens 256 or actuator 258.

Here, an explanation will be given about of the UV hardening light beam wavelength used by the UV processing device. It is necessary that high pressure mercury vapor lamp 54 or ultraviolet ray laser 254, which outputs the UV hardening light beam, quickly hardens fixing portions 31 and 33, the material of which is the UV hardening type of adhesive, and in this case, if this light beam is irradiated onto entire compound objective lens 20, it is possible that the optical characteristics at the working wavelength range, including 408 nm of compound objective lens 20, is in effect degraded. Further, within the hardening wavelength range of 280 to 450 nm, the UV hardening light beam in the wavelength range of 280 to 330 nm on the shorter wavelength side can be considered to be harmful to the lens because it effectively deteriorates the optical characteristics in the working wavelength range of 380 to 450 nm (408 nm in the specific example) of compound objective lens 20. In other words, in the present preferred embodiment, although high pressure mercury vapor lamp 54 or ultraviolet ray laser 254 used as the light source has peaks of emission which not only effectively hardens the UV hardening type of adhesive, but also deteriorates the optical characteristics in the working wavelength range, since the UV hardening light beam harmful to the lens is irradiated selectively only on fixing portions 31 and 33 or its adjacent area, it is possible to assuredly bond compound objective lens 20 to bobbin 40 while reducing the deterioration of the optical characteristics during the assembly stage.

Figure 10:
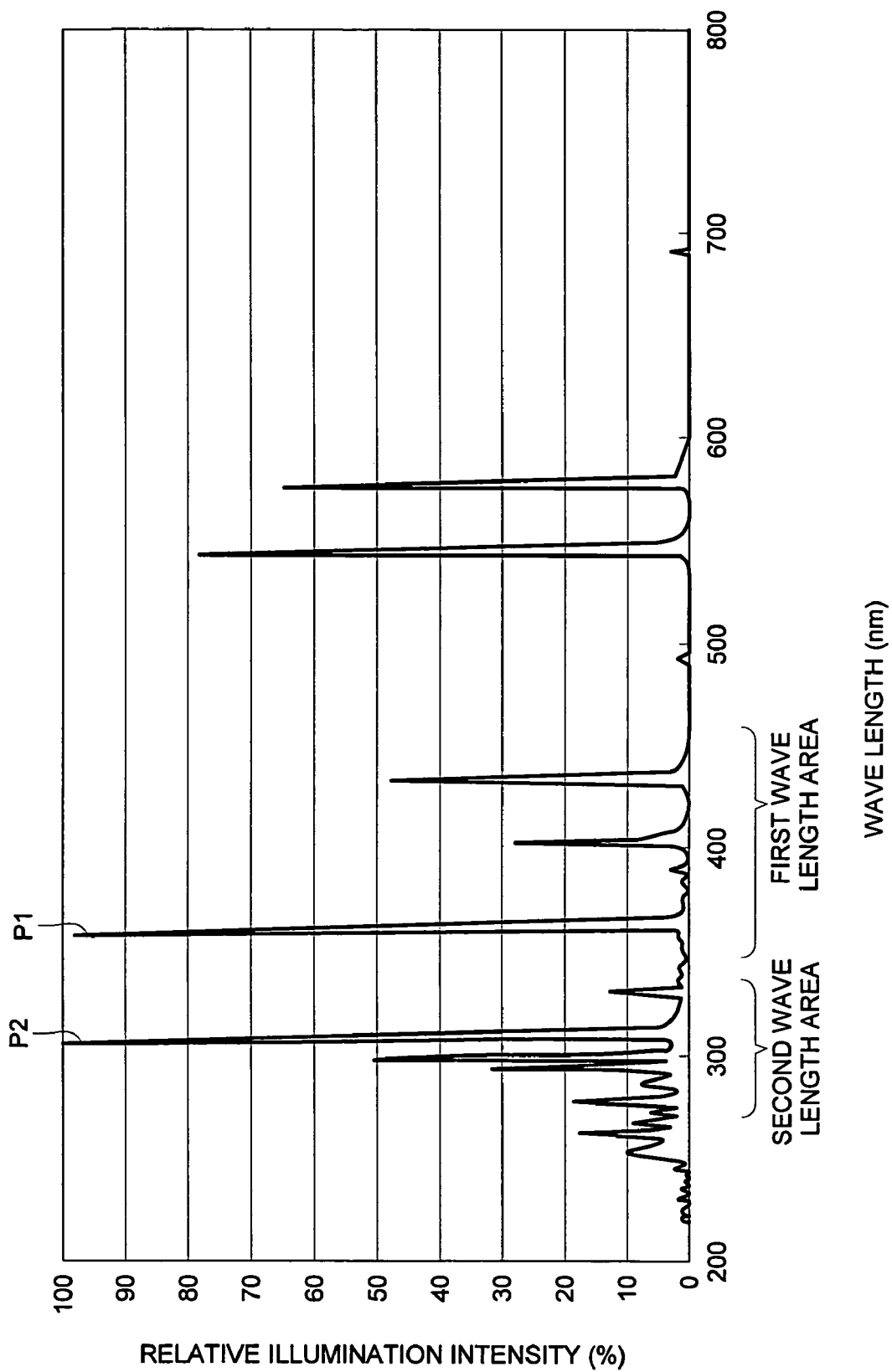
FIG. 10 is a chart explaining spectral characteristics of a high pressure mercury vapor lamp of the comparative example.

FIG. 10 is a chart explaining the spectrum characteristics of a high pressure mercury vapor lamp. The horizontal axis of the chart represents the wavelength while the vertical axis represents the relative irradiation intensity (%). This high pressure mercury vapor lamp has its first emission peak P1 at the wavelength of 368 nm in the first (guaranteed hardening) wavelength range from 350 to 450 nm and its second emission peak P2 at the wavelength of 315 nm in the second (harmful) wavelength range from 280 to 330 nm which is considered harmful to the lens. First emission peak P1 in the first (guaranteed hardening) wavelength range from 350 to 450 nm is regarded effective for UV hardening. On the other hand, the second (harmful) wavelength range from 280 to 330 nm may be effective for UV hardening but, if irradiated over lens member 21 and phase optical element member 22 constituting compound objective lens 20, it is likely to tremendously deteriorate the transmission characteristics of blue light and ultraviolet light of lens portion 24 and phase optical element portion 27 of these members 21 and 22. Second emission peak P2 at the wavelength of 315 nm in the second wavelength range from 280 to 330 nm and other emission peaks near it are particularly thought to cause deterioration of optical characteristics of lens portion 24 at its working wavelength range of 408 nm or the like.

Figure 11:
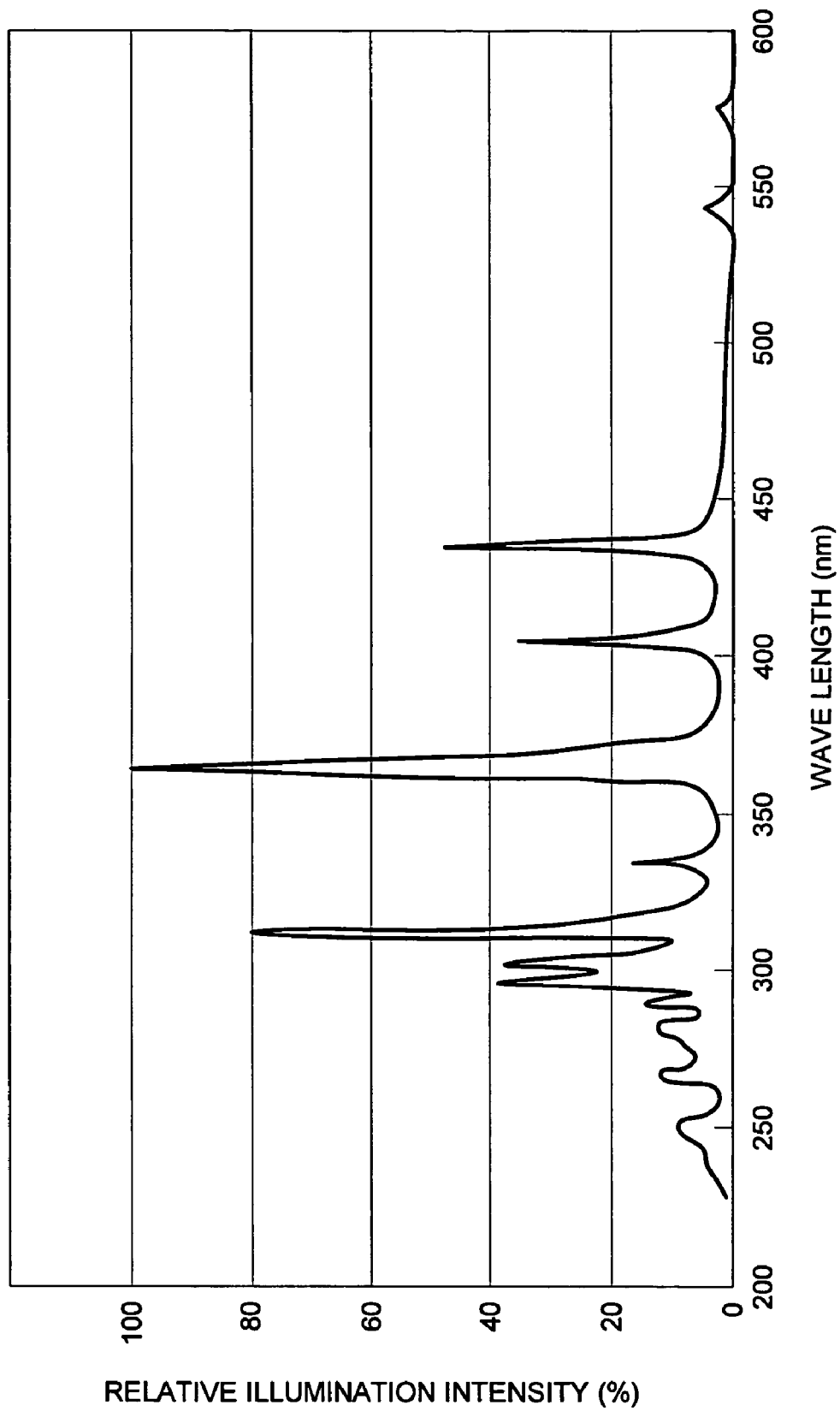
FIG. 11 is a chart explaining the spectral characteristics of a light beam from a high pressure mercury vapor lamp, which has been appropriately attenuated with a light collecting concave mirror.

FIG. 11 is a chart for explaining the status after focusing and appropriate attenuation, using a concave mirror having wavelength characteristics, the light beam from the high pressure mercury vapor lamp light source having the characteristics shown in FIG. 10. As is also clear from the chart, even after being reflected from the concave mirror the UV hardening light beam emitted from the UV processing device contains a large amount of the light in the wavelength range of 280 to 330 nm harmful to the lens, and the relative illumination intensity of the second light emission peak P2 has mostly not been attenuated. When a high pressure mercury vapor lamp incorporated with a concave lens is used, the transmittance of lens member 21, etc. was decreased from about 94% to about 91.3% upon an exposure for about 20 seconds equivalent to about 500 mJ/cm$^2$ on lens member 21. Further, the transmittance of lens member 21, etc. was decreased from about 94% to about 90.0% upon an exposure for about 400 seconds, equivalent to about 9,700 mJ/cm$^2$.

In other words, it is clear that the transmittance of lens member 21, etc. is decreased considerably if the light beam of the high pressure mercury vapor lamp light source as it is, is irradiated on compound objective lens 20.

The above is a case when a high pressure mercury vapor lamp is used as a UV hardening light source, even when ultraviolet ray laser 254 is used as the source of the UV hardening light, it is considered that a similar phenomenon occurs depending on the setting of the light emission peak. In other words, although the wavelength range of 280 to 330 nm harmful to the lens could be effective for UV hardening, if this light beam is irradiated as it is on lens member 21 or phase optical element member 22 which constitute compound objective lens 20, the transmission characteristics of blue light or ultraviolet light of lens portion 24 or phase element portion 27 of these members 21 and 22 are considered to be tremendously deteriorated.

Figure 6:
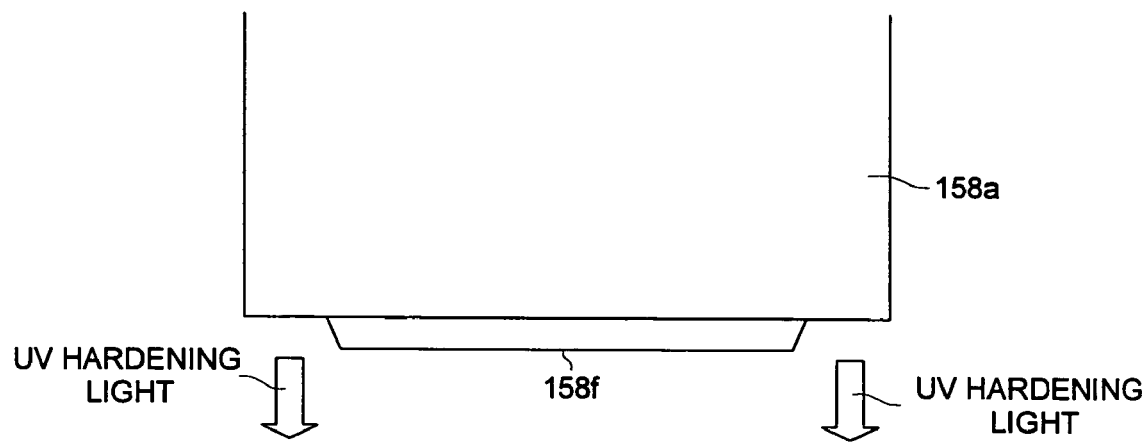
FIGS. 6(a) and 6(b) are a bottom view and a side view, respectively, showing an example of modification for the exposure head shown in FIG. 5, etc.
Figure 6:
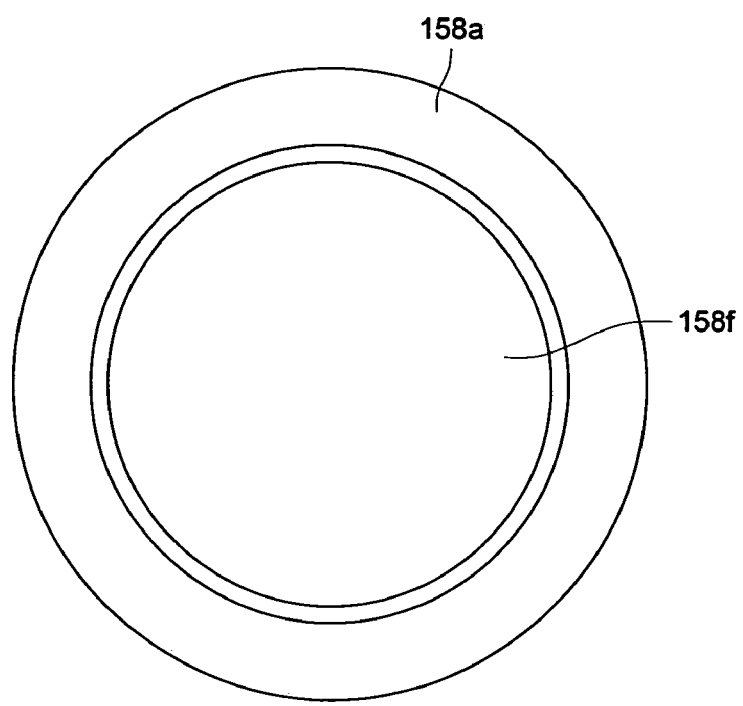

Based on the above presumptions, although a light source is used which has a wavelength range of 280 to 330 nm harmful to the lens at which it is possible to obtain efficient UV hardening, the position of irradiating a UV hardening light beam is restricted to fixing portions 31 and 33 or to their adjacent area using exposure head 158 shown in FIG. 3(*b*) or exposure head 158 shown in FIG. 6, etc. Because of this, it is possible to assuredly bond compound objective lens 20 to bobbin 40 while reducing the deterioration of the optical characteristics during the assembly stage.

Figure 8:
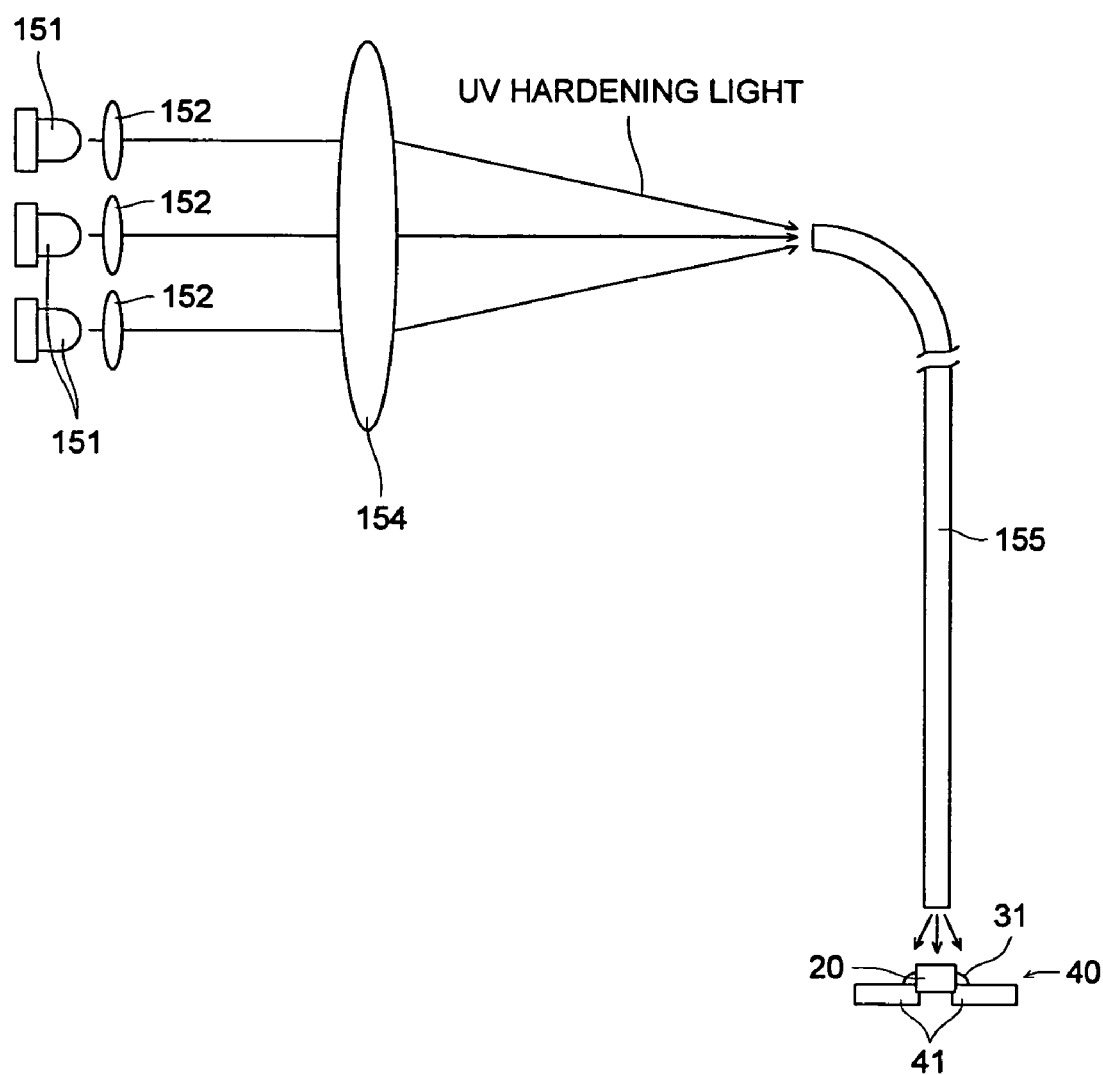
FIG. 8 is a schematic view explaining the UV processing device to irradiate a UV hardening light beam onto a UV hardening type of adhesive.

Next, the details of the adhesive hardening process related to the second fixing method of this invention will be explained. FIG. 8 is a figure that explains the concept of a UV processing device for irradiating the UV hardening light beam onto a UV hardening type of adhesive. The UV processing device is composed of plural LEDs 151 each serving as a light source, plural small lenses 152 for collimating the light beam from each LED 151, collective lens 154 for collecting the UV hardening light beam transmitted through each small lens 152, and light guiding member 155 made of fibers to guide the UV hardening light beam collected by collective lens 154 onto the target. Compound objective lens 20 mounted on bobbin 40 is placed opposite the emission end of light guiding member 155, and fixing portions 31 supplied at suitable positions between compound objective lens 20 and lens support 41 are exposed to the UV hardening light beam and hardened in a short time. In this structure, light guiding member 155 is not needed if a UV hardening light spot of a required size can be formed at a desired location by collective lens 154 or the like.

Although LED 151 outputting the UV hardening light beam hardens the UV hardening type of adhesive which is the material of fixing portions 31 and 33, it has a single optical peak in the guaranteed hardening wavelength range of 350 to 450 nm which practically reduces deterioration of optical characteristics of compound objective lens 20 in the working wavelength range, including 408 nm. In addition, the UV hardening light beam in the wavelength region of 280 to 330 nm on the shorter wavelength side of the guaranteed hardening wavelength range of 350 to 450 nm is considered harmful to the lens because it deteriorates in effect the optical characteristics of compound objective lens 20 in the working wavelength range including 408 nm. In other words, in the present preferred embodiment, since LED 151 is used as the light source and which has an emission peak at the wavelength position at which it is not only possible to effectively harden the UV hardening type of adhesive, but also makes it possible to maintain the optical characteristics in the working wavelength range, it is possible to assuredly bond compound objective lens 20 to bobbin 40 while reducing the deterioration of the optical characteristics during the assembly stage.

Figure 12:
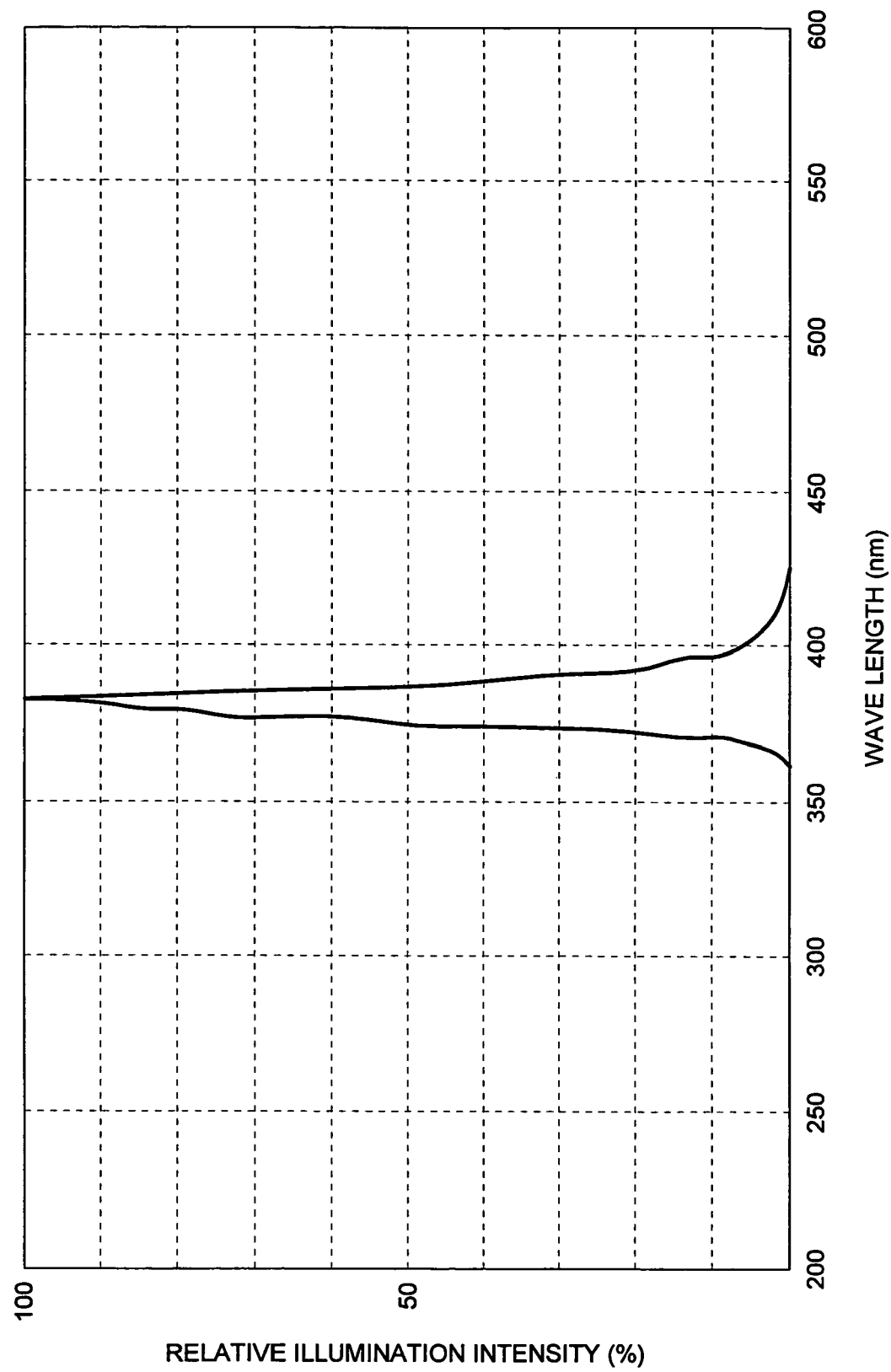
FIG. 12 is a chart explaining the spectral characteristics of an LED of the FIG. 8 UV processing device.

FIG. 12 is a chart explaining the spectral characteristics of LED 151. In this chart, the horizontal axis denotes the wavelength and the vertical axis denotes the relative illumination intensity (%). LED 151 has a single emission peak at a wavelength of 380 nm within the guaranteed hardening wavelength range of 350 to 450 nm, and does not emit any light beam in the harmful wavelength region of 280 to 330 nm on the shorter wavelength side or on the longer wavelength side. In this manner, since it is possible to set the light emission wavelength range of LED 151 to an extremely narrow range and it is also possible to freely set to some extent the range of the emission wavelength, it is ideally suitable for applications such as UV hardening according to an embodiment of the present invention which requires very accurate setting of the emission wavelength. In addition, since it is possible to make LED 151 emit a light beam in an extremely narrow desired band, it is not necessary to use a filter, etc., and hence it is possible to increase the efficiency of the used light. Further, it is also possible to use an LD (semiconductor laser diode) in place of LED 151. In this case, it is possible to carry out a processing in which fixing portions 31 and 33 are irradiated with a UV hardening light beam with increased directivity.

Particularly in the previous case of using a high pressure mercury vapor lamp as a source of the UV hardening light, it was described that the second light emission peak present at a wavelength of 315 nm and light emission peaks near it in the second wavelength range of 280 to 330 nm are considered to be the cause for the deterioration of the optical characteristics at working wavelength 408 nm of lens portion 24 and it will be mentioned that this matter was confirmed in the subsequent preferred embodiment, even when LED 151 is used as a source of UV hardening light, it is considered that a similar phenomenon occurs depending on the setting of the light emission peak. In other words, although the wavelength range of 280 to 330 nm harmful to the lens could be effective for UV hardening, if this light beam is irradiated onto lens member 21 or phase optical element member 22 which constitute compound objective lens 20, the transmission characteristics of blue light or ultraviolet light of lens portion 24 or the phase element portion 27 of these members 21 and 22 are considered to be tremendously deteriorated. On the other hand, not only is the guaranteed hardening wavelength range of 350 to 450 nm effective for UV hardening, but also even if this light beam is irradiated onto lens member 21 or phase optical element member 22 which constitute compound objective lens 20, the transmission characteristics of blue light or ultraviolet light of lens portion 24 or phase element portion 27 of these members 21 and 22 are either almost not deteriorated or the extent of deterioration can be reduced. Based on this background, LED 151 was selected as a light source in the guaranteed hardening wavelength range of 350 to 450 nm. At present, since diodes for use as LED 151 are being sold in different types having varieties of light emission characteristics in the blue or in the ultraviolet range and having sufficient illumination intensities, it is possible to make it emit a light beam assuredly within a relatively narrow wavelength band of the guaranteed hardening wavelength range of 350 to 450 nm, and hence LED 151 is an excellent solid state light emitting device.

Next, the adhesive hardening process will be explained in detail related to the third and fourth fixing methods according to the present invention.

Figure 9:
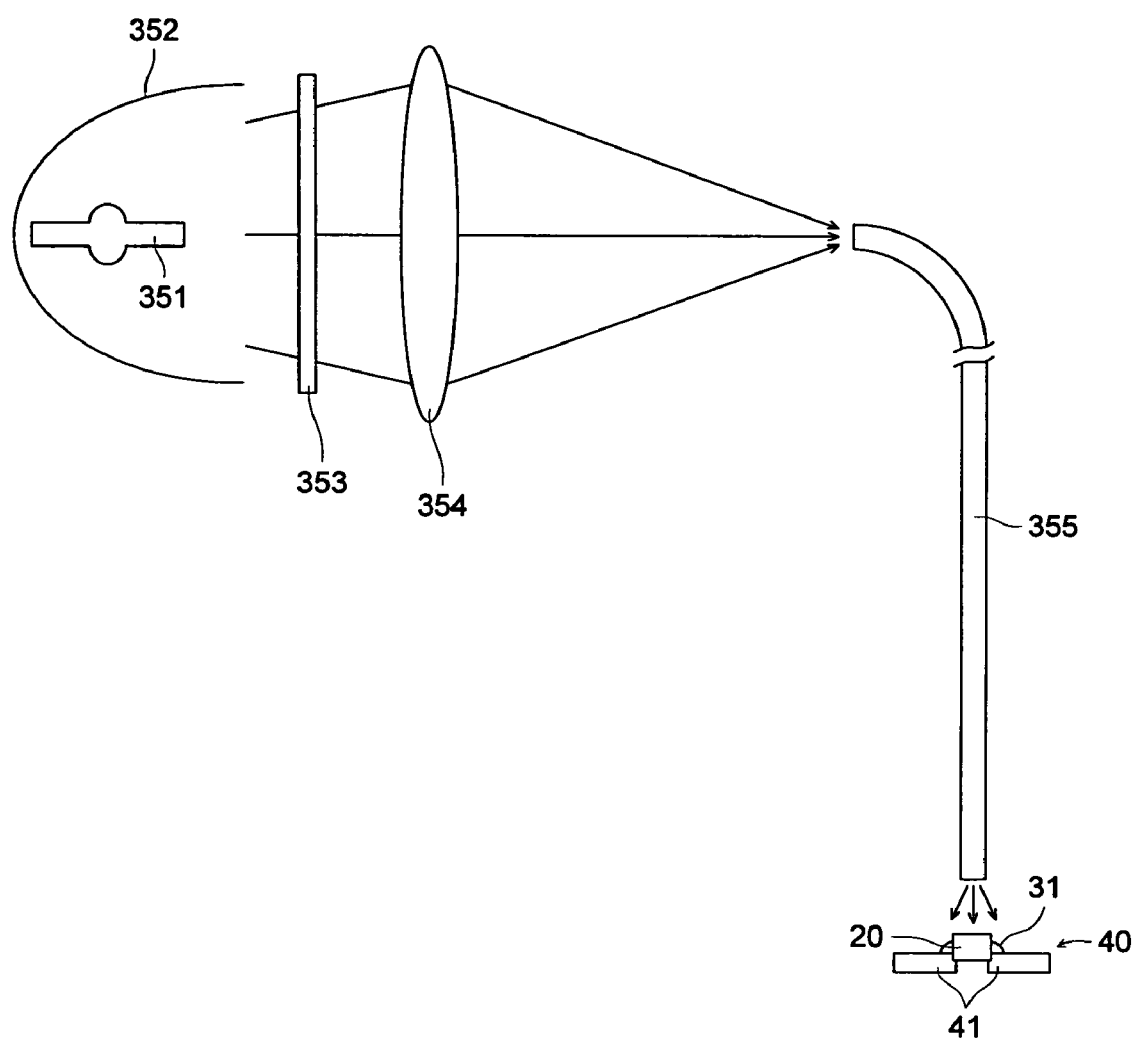
FIG. 9 is a schematic view explaining the UV processing device to irradiate a UV hardening light beam on a UV hardening type of adhesive.

FIG. 9 is a diagram conceptually explaining a UV processing device for irradiating the UV hardening type of adhesive with a UV hardening light beam. This UV processing device is provided with high pressure mercury vapor lamp 351 which serves as the light source, concave mirror 352 which reflects the light beam from high pressure mercury vapor lamp 351 toward the front, cutoff filter 353 which prevents harmful ultraviolet rays on the short wavelength side from the UV hardening light beam from being emitted toward the front from high pressure mercury vapor lamp 351, lens 354 which focuses the UV hardening light beam that has been allowed to pass through cutoff filter 353, and light guiding member 355 made of optical fibers, etc., which guide the UV hardening light beam that has been focused by lens 354 toward the target. Compound objective lens 20 is placed above bobbin 40 at a position opposite the light emitting end of light guiding member 355, and fixing portions 31 provided appropriately between compound objective lens 20 and lens support 41 gets hardened in a short time because of exposure to a UV hardening light beam. Further, light guiding member 355 is not required when a spot of a desired size of UV hardening light is formed at the desired position by lens 354.

Next, to be described will be the wavelengths of the UV hardening light used in the third and fourth fixing methods.

While FIG. 10 describes the spectral characteristics of a high pressure mercury vapor lamp, as has been explained earlier, in particular, the second light emission peak present at a wavelength of 315 nm and adjacent light emission peaks in the second wavelength range of 280 to 330 nm are considered to be the cause of deterioration of the optical characteristics at working wavelength 408 nm of lens portion 24. In the present preferred embodiment, the ultraviolet rays of the second wavelength region 280 to 330 nm harmful to the lens are eliminated from the light beam of high pressure mercury vapor lamp light source 351 and particularly second light emission peak P2 at a wavelength of 315 nm is attenuated. Specifically, the relative intensity of second light emission peak P2 in the second wavelength range of 280 to 330 nm is set at 30% or less, for example, relative to first light emission peak P1 in the first wavelength range of 350 to 450 nm.

Figure 13:
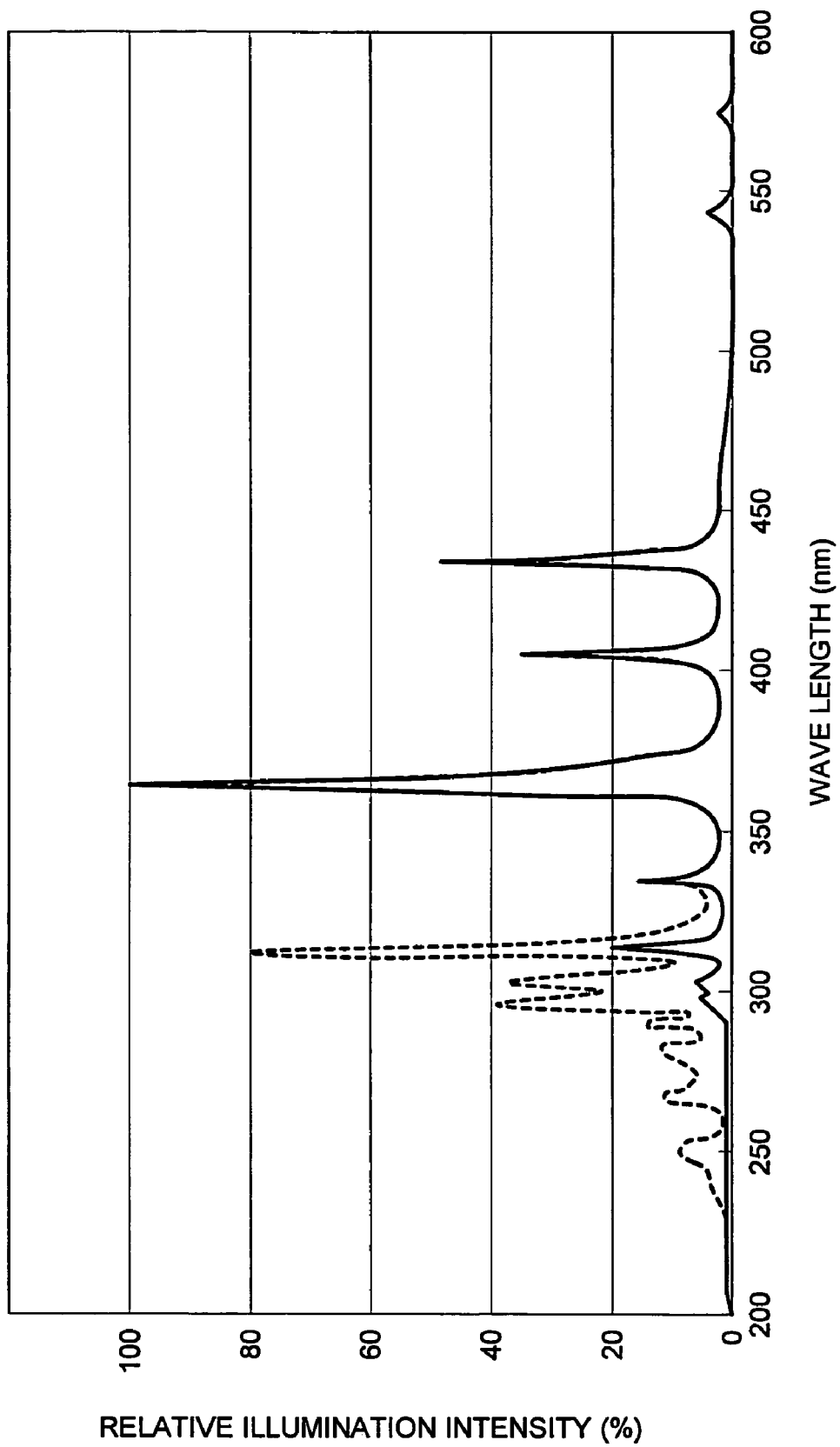
FIG. 13 is a chart explaining the condition of a light beam from a high pressure mercury vapor lamp, which has been appropriately attenuated with a light collecting concave mirror.

FIG. 13 is a chart to explain the status after focusing and appropriately attenuating the light beam emitted from high pressure mercury vapor lamp light source 351, using a concave mirror having wavelength characteristics. In this chart, the solid line indicates the relative illumination intensity when a concave mirror of the first type is used, while the dashed line indicates the relative illumination intensity when a concave mirror of the second type is used. As is also clear from the chart, when a concave mirror of the second type is used, the UV hardening light beam emitted from the UV processing device contains a large amount of the light beam from the light source in the harmful wavelength range of 280 to 330 nm, and the relative illumination intensity of second light emission peak P2 has almost not been attenuated. Contrarily, when a concave mirror of the first type is used, the UV hardening light emitted from the UV processing device contains almost no light beam from the light source in the second wavelength range of 280 to 330 nm, and the relative illumination intensity of second light emission peak P2 is less than 20%. Further, in both cases of using either the first type of concave mirror or the second type of concave mirror, it was found that there was no big difference in the absolute illumination intensity of first light emission peak P1. From the above, it is clear that attenuating only second light emission peak P2 of high pressure mercury vapor lamp 351, using the first type of concave mirror indicated by the solid line in the chart, is an effective method for reducing deterioration in the optical characteristics of compound objective lens 20. In other words, even when the UV hardening light beam for hardening the adhesive is irradiated over the entire surfaces of lens member 21 or phase optical element member 22, it is possible to reduce deterioration in transmittance of members 21 and 22 by using a UV hardening light beam having an emission spectral distribution indicated by the solid line.

Table 1 below indicates examples of methods of fixing, to each other, the optical elements (specifically, members 21 and 22) constituting compound objective lens 20 shown in FIG. 2.

TABLE 1

|  | Example 1 | Example 2 | Example 3 | Example 4 |
| --- | --- | --- | --- | --- |
| Hardening Time | 5 seconds | 6 seconds | 8 seconds | 10 seconds |
| Radiation Energy | 4500 mJ/cm$^2$ | 5400 mJ/cm$^2$ | 7200 mJ/cm$^2$ | 9000 mJ/cm$^2$ |
| Transmittance | 93.4% | 93.3% | 93.3% | 93.3% |

In Table 1, the hardening time indicates the processing time when using the UV hardening light beam having the light emission characteristics indicated by the solid line in the chart of FIG. 13, the radiation energy indicates the energy of the light beam at the working position at which the hardening process is carried out, and the transmittance is at wavelength 408 nm. Further, since the transmittance of lens member 21, etc., before carrying out the hardening process was 94%, the transmittance values shown in this table can be considered to have deteriorated only by the extent that they are lower than 94%. As is also clear from Table 1, it is evident that there is almost no reduction in transmittance of the optical elements such as the lens, etc. due to a hardening process time of 5 to 10 seconds using the UV hardening light beam according to the present preferred embodiment in which second light emission peak P2 at a wavelength of 315 nm has been attenuated.

Table 2 shows comparative examples of the method of fixing optical elements to each other.

TABLE 2

|  | Comparative Example 1 | Comparative Example 2 | Comparative Example 3 |
| --- | --- | --- | --- |
| Hardening Time | 3 seconds | 5 seconds | 10 seconds |
| Radiation Energy | 430 mJ/cm$^2$ | 655 mJ/cm$^2$ | 1072 mJ/cm$^2$ |
| Transmittance | 91.8% | 91.2% | 90.9% |

In this case, a UV hardening light beam with the light emission characteristics shown in the FIG. 10 chart is used instead of the UV hardening light beam with the light emission characteristics indicated by the solid line in the FIG. 13 chart. As is also clear from Table 2, in the case where second light emission peak P2 is not attenuated, the reduction in transmittance of the optical elements such as lenses is substantial even when the hardening process time by means of a UV hardening light beam is about 12 seconds (equivalent to less than 1 second without focusing by a concave mirror).

Figure 14:
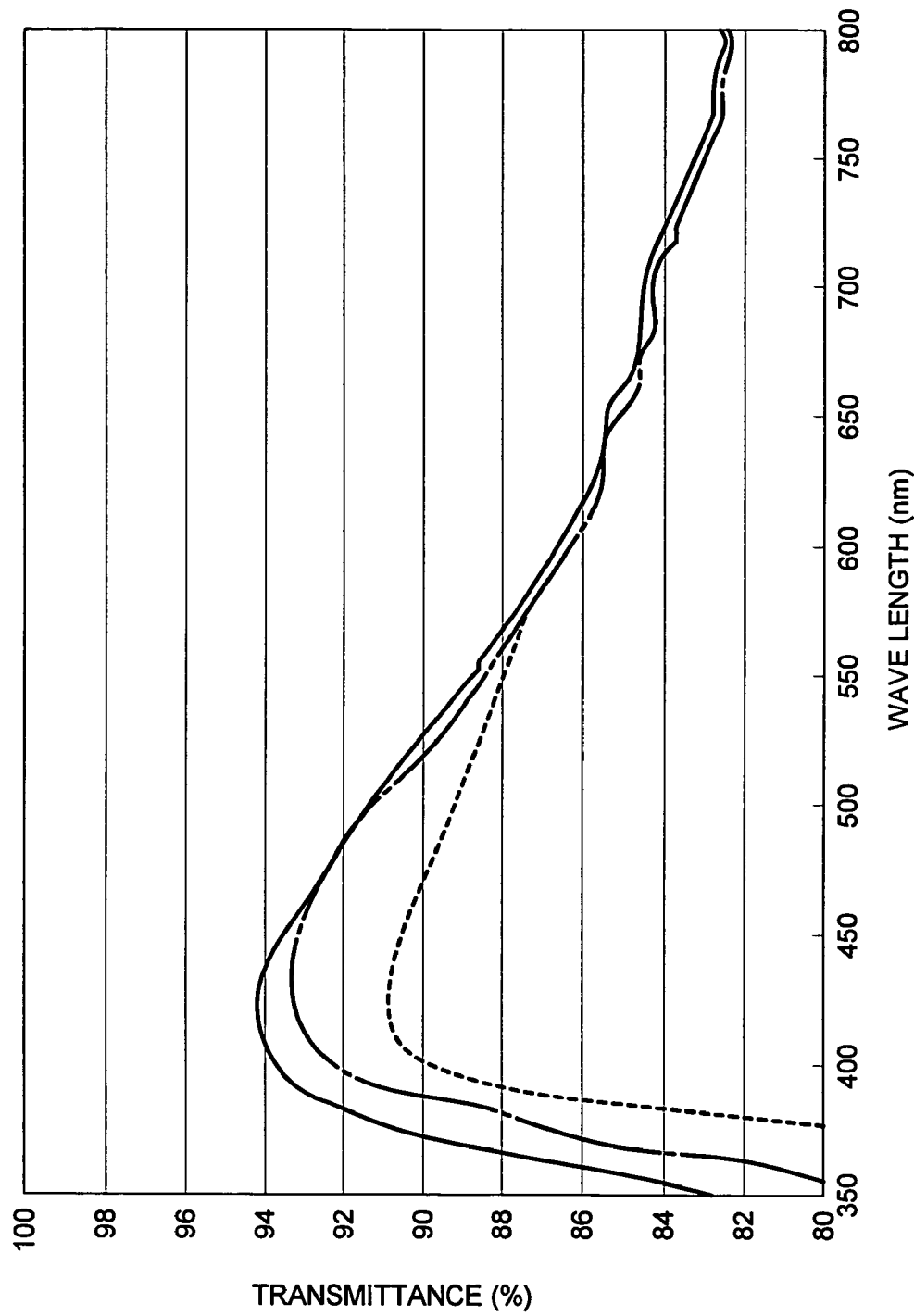
FIG. 14 is a chart explaining deterioration of transmittance caused from hardening process when using a UV hardening light beam.

FIG. 14 is a diagram for explaining deterioration in transmittance due to the hardening process using a UV hardening light beam. The solid line in the chart indicates the transmittance distribution of the optical elements such as lenses before UV hardening, and the dashed line corresponds to Comparative Example 3 in Table 2. In other words, it is evident that the reduction in transmittance is substantial when a naked high pressure mercury vapor lamp light is used for UV hardening. In the chart, the single dot and dash line corresponds to Examples in Table 1, and it is clear that the reduction in transmittance has been substantially suppressed by a UV hardening light beam exhibiting the optical characteristics shown by the solid line in the FIG. 13 chart.

Although, a high pressure mercury vapor lamp was used in the above descriptions as the light source of a UV hardening light, it is also possible to use lamps having various types of light emission characteristics such as a halogen lamp. Even in such a case, the first wavelength range of 350 to 450 nm is used for hardening, and in order to reduce the deterioration in the optical characteristics due to the second wavelength range of 280 to 330 nm, the light emission peaks in this second wavelength range are attenuated.

Although the above description is based on the working 408 nm wavelength, regarding compound objective lens 20, which is used at other wavelength in the range of 380 to 450 nm, by control of the incidence position of a UV hardening light beam (the first fixing method), no particular degradation of transmittance is observed at any other wavelength within the wavelength range of 380 to 450 nm (the second fixing method) and transmittance is improved to be better than a comparative examples at the wavelength range from 380 to 450 nm according to the example shown in the chart of FIG. 14 (the third and-fourth fixing methods), therefore it is certain that high-accuracy optical data reading and writing can be performed.

Although the above describes a method of bonding compound objective lens 20 on bobbin 40, the same applies to structuring compound objective lens 20 by cementing lens member 21 to phase optical element member 22.

Figure 15:
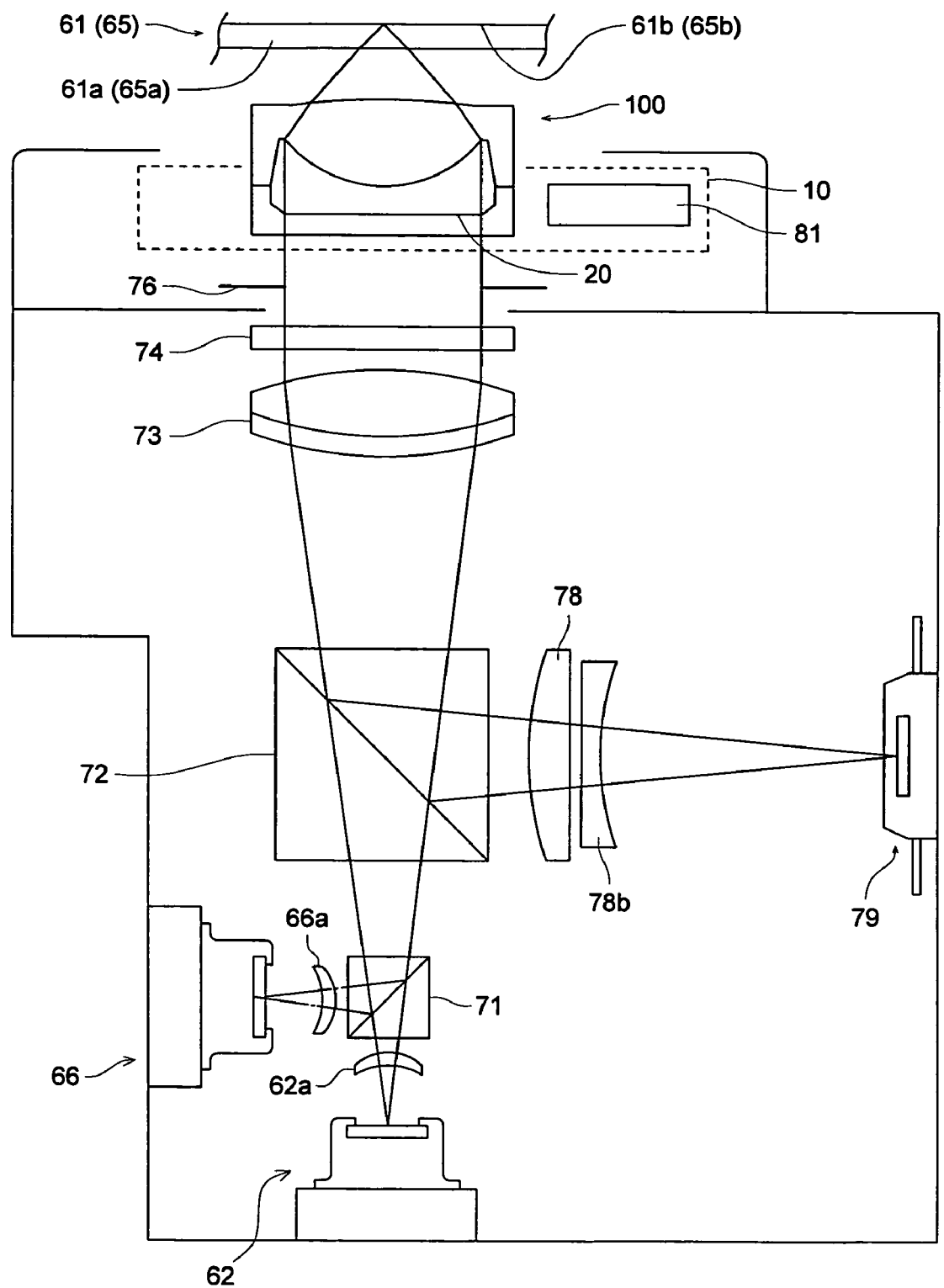
FIG. 15 is a view showing the structure of an optical pickup in which the objective lens unit shown in FIG. 1, etc. is installed.

FIG. 15 shows a schematic structure of the optical pickup where objective lens unit 10 shown in FIG. 1 is mounted on an optical head.

The optical pickup contains semiconductor laser 62 which emits a luminous flux (specifically, a wavelength of 408 nm) for playing back the data of first optical disc 61, and semiconductor laser 66 which emits a luminous flux (specifically, a wavelength of 650 nm) for playing back the data of second optical disc 65, that is, being capable of emitting two laser light beams of different wavelength. The laser light beam from both semiconductor lasers 62 and 66 is irradiated onto optical discs 61 and 65 through objective lens unit 10 mounted on optical head 100 (specifically, compound objective lens 20) and the reflected light beam from optical disc 61 and 65 is collected through objective lens unit 10 or the like.

To play back first optical disc 61, a beam is emitted from first semiconductor laser 62, and the emitted luminous flux goes through beam splitter 71, polarized light beam splitter 72, collimator 73, and then ¼ wavelength plate 74, and is turned into a circularly polarized parallel luminous flux. This luminous flux is reduced through aperture 76 and collected onto information recording surface 61b via transparent base board 61a of first optical disc 61 by compound objective lens 20.

The luminous flux modulated and reflected by information bits on information recording surface 61b goes through compound objective lens 20, aperture 76, ¼ wavelength plate 74, and then collimator 73, and enters polarized light beam splitter 72 and is reflected there; then, it is astigmatised by lens 78 and cylindrical lens 78b and enters into photodetector 79; thus, by using the output signals from the detector, read signals of the data recorded on first optical disc 61 are obtained.

In addition, focus detection and track detection are performed by detecting the change in quantity of light resulting from the change in the spot profile and the spot position on photodetector 79. Based on this detection, two-dimensional actuator 81 installed on optical head 100 moves objective lens unit 10 in the optical axis direction so that the luminous flux from first semiconductor laser 62 is focused on information recording surface 61b and also moves objective lens unit 10 in the direction perpendicular to the optical axis so that the luminous flux from semiconductor laser 62 is focused on a specific track.

On the other hand, for playback of second optical disc 65, a light beam is emitted from second semiconductor laser 66, and the emitted luminous flux is reflected by beam splitter 71 which is a means for combining beams, and goes through polarization beam splitter 72, collimator 73, ¼ wavelength plate 74, aperture 76, and compound objective lens 20 in the same way as above luminous flux from first semiconductor laser 62, and it is then collected onto information recording surface 65b via transparent base board 65a of second optical disc 65.

The luminous flux modulated and reflected by information bits on information recording surface 65b goes back through compound objective lens 20, aperture 76, ¼ wavelength plate 74, collimator 73, polarized light beam splitter 72, and cylindrical lens 78b, and enters optical detector 79; thus, by using the output signals from the detector, read signals of the data recorded on second optical disc 65 are obtained.

In addition, in the same way as for first optical disc 61, focus detection and track detection are performed by detecting the change in the quantity of light resulting from the change in the spot profile and the spot position on photodetector 79, and two-dimensional actuator 81 installed on optical head 100 positions objective lens unit 10 for focusing and tracking.

Since objective lens unit 10, to be fixed by the method explained in FIGS. 3, 8 and 9, is mounted on the optical pickup explained above, and objective lens unit 10 contains compound objective lens 20 in which little degradation of transmission characteristics occurs through mounting and fixing, highly accurate data reading and recording are realized.

Although the fixing method of an optical element on objective lens unit 10 has been described above, degradation of the transmission characteristics can also be reduced on other optical elements such as collimator 73, polarized light beam splitter 72 and cylindrical lens 78b by employing the same fixing method.

The Second Embodiment

An optical component according to the second embodiment of the present invention is described hereunder. While compound objective lens 20 is mounted on objective lens unit 10 in the first embodiment, a plastic single lens is employed as the objective lens in this second embodiment.

Figure 16:
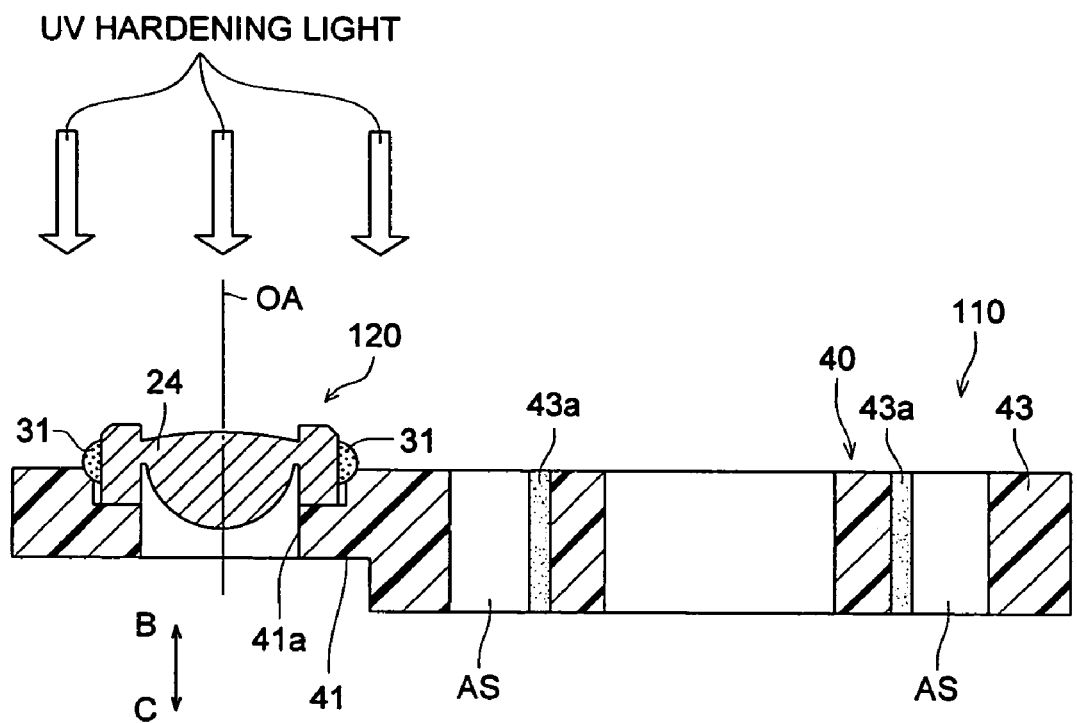
FIG. 16 is a cross sectional side view of the objective lens unit of the second embodiment.

FIG. 16 is a cross-sectional side view of objective lens unit 110. The second embodiment is an altered configuration of the first embodiment, and so the same parts/components are given the same designations and no further description is given. Objective lens unit 110 is so constructed that objective lens 120 containing a single lens as an optical element is fixed on bobbin 40, which is an optical component. Even with this structure, the UV hardening light beam can be irradiated only onto fixing portions 31, for example, at four portions by using exposure head 58, etc. as shown in FIG. 3(*b*) (the first fixing method), or the UV hardening light beam, excluding harmful ultraviolet light, can be irradiated onto and around fixing portions 31 by the UV processing unit shown in FIGS. 8 and 9 (the second to the fourth fixing methods), and so fixing portions 31 can be hardened in a short time while reducing deterioration of the optical characteristics of lens portion 24.

An optical pickup which employs objective lens unit 110 in FIG. 16 basically has the same structure as in FIG. 15. However, if lens portion 24 is not capable of processing two different wavelengths for example due to its diffractive structure, semiconductor laser 66 and beam splitter 71 for second optical disc 65 are not required.

The Third Embodiment

Figure 17:
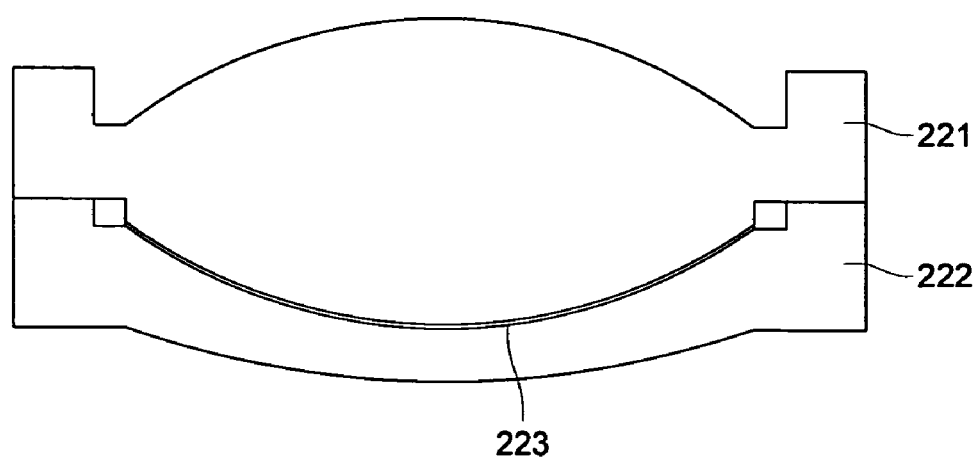
FIG. 17 is a cross sectional side view of the objective lens of the third embodiment.

An objective lens which is an optical component according to the third embodiment is described hereunder. As shown in FIG. 17, objective lens 220 is a cemented lens where a pair of different plastic lenses 221 and 222 are cemented to each other on their optical surfaces by bonding layer 233 formed of a UV hardening type of adhesive. In this structure, two plastic lenses 221 and 222 have, for example, a different refractive index.

Even with this structure, by applying the UV hardening process to paired plastic lenses 221 and 222, between which unhardened bonding layer 233 is sandwiched, by the UV processing devices shown in FIGS. 3, 8 and 9, bonding layer 233 can be quickly hardened and degradation of the transmission characteristics of objective lens 220 can be reduced.

In the third embodiment, the working wavelength used for reading and writing data for example is also assumed to be from 380 to 450 nm. In this embodiment, the guaranteed hardening wavelength (first) range from 350 to 450 nm is also utilized for hardening bonding layer 233, and thereby degradation of the optical characteristics of objective lens 220 caused by the harmful (second) wavelength range from 280 to 330 nm is reduced. In the third and fourth fixing method, the intensity of emission peaks in the second wavelength range from 280 to 330 nm is reduced to be, for example, not more than 30% of the relative intensity of the first wavelength range.

The Fourth Embodiment

Figure 18:
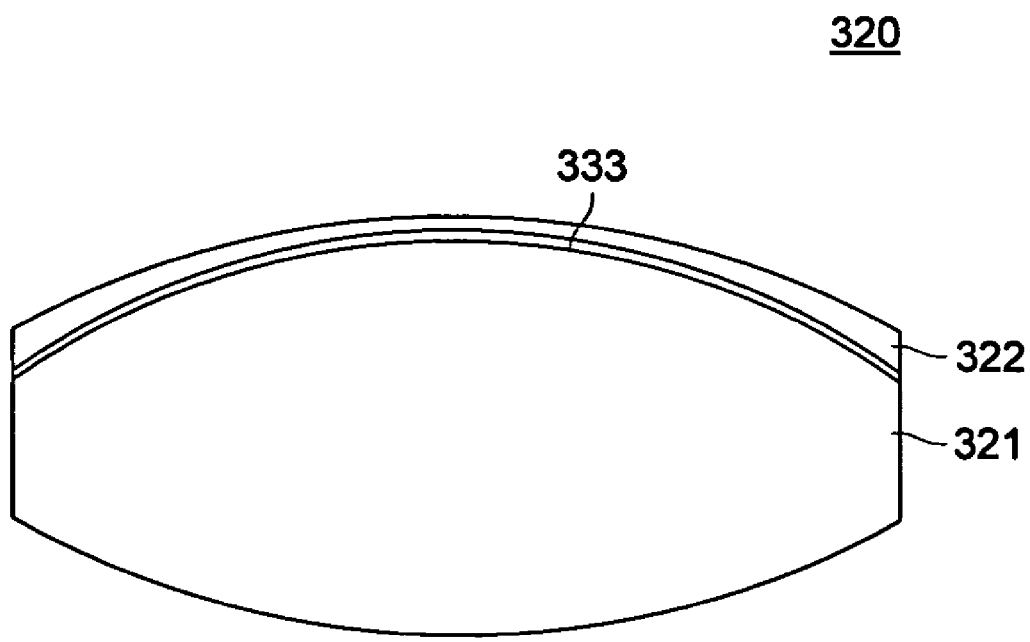
FIG. 18 is a cross sectional side view of the objective lens of the fourth embodiment.

An objective lens which is an optical component according to the fourth embodiment is described hereunder. As shown in FIG. 18, objective lens 320 is a hybrid lens where glass lens 321 and plastic lens 322 are cemented to each other on their optical surfaces by bonding layer 333 formed of a UV hardening type of adhesive. In this structure, plastic lens 322 is, for example, a non-spherical lens.

Even with this structure, by applying a UV hardening process, paired lenses 321 and 322, between which an unhardened bonding layer 333 is sandwiched, by the UV processing device shown in FIGS. 3, 8 and 9, bonding layer 333 can be quickly hardened and degradation of the transmission characteristics of objective lens 320 can be reduced.

In the fourth embodiment, the working wavelength used for reading and writing data for example is also assumed to be from 380 to 450 nm. In this embodiment, the guaranteed hardening (first) wavelength range from 350 to 450 nm is also utilized for hardening bonding layer 333, whereby degradation of the optical characteristics of objective lens 320, caused by the harmful (second) wavelength range from 280 to 330 nm is reduced. In the third and fourth fixing method, the intensity of the emission peaks in the second wavelength range from 280 to 330 nm are reduced to be, for example, not more than 30% of the relative intensity of the first wavelength.

The present invention has been described above by referring to preferred embodiments, but the invention is not limited to those embodiments. For example, although ultraviolet light is used for the light-hardening in the above embodiments, it is allowable to alternatively employ fixing portions formed of light-hardening type adhesives which are hardened by visible light.

Further, although fixing portions 31 and 33 in those embodiments are UV-hardened in a single process by the UV processing device shown in FIGS. 3(*b*), 8 and 9, fixing portions 31 and 33 can be optically hardened in plural and separate processes. In other words, if sufficient hardening time cannot be ensured because of a limitation of tact time in a manufacturing line, fixing portions 31 and 33 are processed first by tacking (temporary hardening) which can be completed in a short time, and then at any other time, for example while being kept in stock after removal from the production line, fixing portions 31 and 33 are subjected to final bonding (final hardening) for the sufficient length of time so as to attain permanent bonding strength. This enables flexible incorporation of the UV processing device shown in FIGS. 3, 8 and 9, in a manufacturing line, irrespective of the hardening time.

Still further, although the above embodiments describe objective lens unit 10 for an optical pickup, the fixing method of the present invention can also be applied to other components. That is, compound objective lens 20 can be fixed not only on bobbin 40 but also on other various holders and components by UV hardening.

What is claimed is:

1. A fixing method of fixing an optical element made of plastic, which has an optically functional surface and a periphery around the optical element, and is used within a prescribed working wavelength range in a wavelength region including at least blue light and ultraviolet light, by bonding the periphery to another member with a light-hardening type of adhesive comprising the steps of:
   supplying the light-hardening type of adhesive to bonding spots between the periphery and the another member; and
   irradiating a processing light beam onto the bonding spots to harden the light-hardening type of adhesive,
   wherein the processing light beam has a first emission peak having a first illumination intensity in a first wavelength range from 350 to 450 nm; and wherein the processing light beam has a second emission peak in the specific wavelength range from 280 to 330 nm, which has an illumination intensity less than or equal to 30% of the first illumination intensity of the first emission peak.

2. The fixing method of claim 1, wherein the prescribed working wavelength range of the optical element is in a range from 380 to 450 nm.

3. The fixing method of claim 1, wherein the processing light beam is picked up by way of at least one of a filter and a mirror which have attenuating characteristics against a light beam from a light source in the specific wavelength range.

4. The fixing method of claim 1, wherein the another member is a supporting member for supporting the optical element.

5. The fixing method of claim 1, wherein the another member is an optical member for performing a prescribed optical function in cooperation with the optical element.

6. The fixing method of claim 5, wherein an optical component comprising the optical element and the optical member is either a single lens, a compound lens, a cemented lens or a hybrid lens.

7. An optical component comprising:
   an optical element; and
   another member;
   wherein the optical element and the another member are fixed to each other by the fixing method of claim 1.

8. The optical component of claim 7, wherein:
   the optical element is made of plastic having an optically functional surface and a periphery around the optical element, to be used in a prescribed working wavelength range in a wavelength region including at least blue light and ultraviolet light,
   the another member is bonded to the periphery; and
   the optical component further comprises a bonding device which is formed of a light-hardening type of adhesive to bond the periphery to the another member at prescribed bonding spots by light hardening with a processing light beam.

9. The optical component of claim 8, wherein the optical element is an objective lens through which an incident luminous flux converges so as to form a spot on a recording surface of an optical recording medium.

10. An optical pickup comprising:
    an optical component of claim 7,
    wherein information can be read from a recording surface of an optical recording medium or can be written on the recording surface.

11. The fixing method of claim 1, which is used for an optical component of an optical pickup.

12. A fixing method of fixing an optical element made of plastic, which has an optically functional surface and a periphery around the optical element, and is used within a prescribed working wavelength range in a wavelength region including at least blue light and ultraviolet light, by bonding the periphery to another member with a light-hardening type of adhesive comprising the steps of:
    supplying the light-hardening type of adhesive to bonding spots between the periphery and the another member;
    reducing the intensity of light emission in a specific wavelength range from 280 to 330 nm to be less than or equal to a prescribed value; and
    irradiating a processing light beam onto the bonding spots to harden the light-hardening type of adhesive,
    wherein the processing light beam has a first emission peak having a first illumination intensity in a first wavelength range from 350 to 450 nm; and wherein a maximum illumination intensity within the specific wavelength range from 280 to 330 nm is less than or equal to 30% of the first illumination intensity of the first emission peak.

13. The fixing method of claim 12, wherein the prescribed working wavelength range of the optical element is in a range from 380 to 450 nm.

14. The fixing method of claim 12, wherein the processing light beam is picked up by way of at least one of a filter and a mirror which have attenuating characteristics against a light beam from a light source in the specific wavelength range.

15. The fixing method of claim 12, wherein the another member is a supporting member for supporting the optical element.

16. The fixing method of claim 12, wherein the another member is an optical member for performing a prescribed optical function in cooperation with the optical element.

17. The fixing method of claim 16, wherein an optical component comprising the optical element and the optical member is either a single lens, a compound lens, a cemented lens or a hybrid lens.

18. An optical component comprising:
    an optical element; and
    another member;

wherein the optical element and the another member are fixed to each other by the fixing method of claim 12.

19. The optical component of claim 18, wherein:

the optical element is made of plastic having an optically functional surface and a periphery around the optical element to be used in a prescribed working wavelength range in a wavelength region including at least blue light and ultraviolet light, the another member is bonded to the periphery; and the optical component further comprises a bonding device which is formed of a light-hardening type of adhesive to bond the periphery to the another member at prescribed bonding spots by light hardening with a processing light beam.

20. The optical component of claim 19, wherein the optical element is an objective lens through which an incident luminous flux converges so as to form a spot on a recording surface of an optical recording medium.

21. An optical pickup comprising:

an optical component of claim 18, wherein information can be read from a recording surface of an optical recording medium or can be written on the recording surface.

22. The fixing method of claim 12, which is used for an optical component of an optical pickup.

23. A fixing method of fixing an optical element made of plastic, which has an optically functional surface and a periphery around the optical element, and is used within a prescribed working wavelength range in a wavelength region including at least blue light and ultraviolet light, by bonding the periphery to another member with a light-hardening type of adhesive comprising the steps of:

supplying the light-hardening type of adhesive to bonding spots between the periphery and the another member; and irradiating a processing light beam onto the bonding spots to harden the light-hardening type of adhesive;

wherein the processing light beam has a first emission peak having a first illumination intensity in a first wavelength range from 350 to 450 nm, and a maximum illumination intensity within a specific wavelength range from 280 to 330 nm; and wherein the step of irradiating is preceded by a step of reducing, to reduce the intensity of light emission in the specific wavelength range from 280 to 330 nm to be less than or equal to a prescribed value.

24. The fixing method of claim 23, wherein, in the step of reducing, the intensity of light emission in the specific wavelength range is reduced to be less than or equal to 30% of the first illumination intensity of the first emission peak.

* * * * *